US011441324B2

(12) United States Patent
Slater et al.

(10) Patent No.: US 11,441,324 B2
(45) Date of Patent: Sep. 13, 2022

(54) WAVE GENERATOR SYSTEM AND METHOD FOR FREE-FORM BODIES OF WATER

(71) Applicant: Kelly Slater Wave Company, LLC, Los Angeles, CA (US)

(72) Inventors: Kelly Slater, Los Angeles, CA (US); Adam Fincham, Los Angeles, CA (US)

(73) Assignee: Kelly Slater Wave Company, LLC, Los Angeles, CA (US)

( * ) Notice: Subject to any disclaimer, the term of this patent is extended or adjusted under 35 U.S.C. 154(b) by 0 days.

(21) Appl. No.: 17/108,369

(22) Filed: Dec. 1, 2020

(65) Prior Publication Data
US 2021/0277676 A1  Sep. 9, 2021

Related U.S. Application Data

(63) Continuation of application No. 16/140,405, filed on Sep. 24, 2018, now Pat. No. 10,858,851, which is a (Continued)

(51) Int. Cl.
*E04H 4/00* (2006.01)
*A63B 69/00* (2006.01)
(Continued)

(52) U.S. Cl.
CPC ....... *E04H 4/0006* (2013.01); *A63B 69/0093* (2013.01); *A63G 31/007* (2013.01); *E04H 4/1245* (2013.01)

(58) Field of Classification Search
CPC .................................................. E04H 4/0006
(Continued)

(56) References Cited

U.S. PATENT DOCUMENTS 2,994,201 A   8/1961  Hutchings
3,008,673 A   11/1961  Caddell
(Continued)

FOREIGN PATENT DOCUMENTS

AU    558270 B2   1/1987
AU   4889499 A    2/2000
(Continued)

OTHER PUBLICATIONS

Boussinesq M.J., "Théorie de l'intumescence liquide, appelée onde solitaire ou de translation, se propageant dans un canal rectangulaire," C.-R. Acad. Sci. Paris, 72(1871), p. 755-59.
(Continued)

*Primary Examiner* — Lori L Baker
(74) *Attorney, Agent, or Firm* — Mintz Levin Cohn Ferris Glovsky and Popeo, P.C.

(57) ABSTRACT

A wave park is disclosed that includes a pool for containing a body of water, and a track positioned proximate the pool. The wave park further includes at least one foil coupled to move along the track, the at least one foil being at least partially submerged in the body of water. The at least one foil has a curvilinear cross-sectional geometry that includes a leading surface that is concave about a vertical axis to provide drag to generate a primary wave laterally in water of the body of water that contacts the leading surface of the foil, and a trailing surface that narrows from a maximum width of the foil adjacent the leading surface to a point at an end of the foil, the trailing surface to decrease the drag of the foil and to minimize oscillatory waves that trail the primary wave.

18 Claims, 22 Drawing Sheets

Related U.S. Application Data continuation of application No. 15/333,166, filed on Oct. 24, 2016, now Pat. No. 10,081,956, which is a continuation of application No. 14/286,807, filed on May 23, 2014, now Pat. No. 9,476,213, which is a continuation-in-part of application No. 14/071,514, filed on Nov. 4, 2013, now Pat. No. 9,546,491, which is a continuation of application No. 13/609,239, filed on Sep. 10, 2012, now Pat. No. 8,573,887, which is a continuation of application No. 12/274,321, filed on Nov. 19, 2008, now Pat. No. 8,262,316.

(51) Int. Cl.
*A63G 31/00* (2006.01)
*E04H 4/12* (2006.01)

(58) Field of Classification Search
USPC ............... 4/491, 488, 541.1, 492, 493, 904; 482/55; 405/52
See application file for complete search history.

(56) References Cited

U.S. PATENT DOCUMENTS

| | | |
|---|---|---|
| 3,530,211 A | 9/1970 | Uhlig |
| 3,802,697 A | 4/1974 | Le Mehaute |
| 3,913,332 A | 10/1975 | Forsman |
| 4,078,605 A | 3/1978 | Jones |
| 4,792,260 A | 12/1988 | Sauerbier |
| 4,812,077 A | 3/1989 | Raike |
| 5,207,531 A | 5/1993 | Ross |
| 6,336,771 B1 | 1/2002 | Hill |
| 7,004,093 B2 | 2/2006 | Loui et al. |
| 8,262,316 B2 | 9/2012 | Slater et al. |
| 8,573,887 B2 | 11/2013 | Slater et al. |
| 9,476,213 B2 | 10/2016 | Slater et al. |
| 9,546,491 B2 | 1/2017 | Slater et al. |
| 9,574,360 B2 | 2/2017 | Fincham et al. |
| 2003/0009821 A1 | 1/2003 | Lochtefeld |
| 2003/0119592 A1 | 6/2003 | Lochtefeld et al. |
| 2003/0180095 A1 | 9/2003 | McFarland |
| 2003/0198515 A1 | 10/2003 | McFarland |
| 2005/0178310 A1 | 8/2005 | Loui et al. |
| 2008/0089744 A1 | 4/2008 | McFarland |
| 2009/0260146 A1 | 10/2009 | Webber |
| 2010/0124459 A1 | 5/2010 | Slater et al. |
| 2010/0124460 A1 | 5/2010 | Fricano |
| 2010/0125943 A1 | 5/2010 | Lochtefeld et al. |
| 2013/0061382 A1 | 3/2013 | Fincham et al. |
| 2014/0059758 A1 | 3/2014 | Slater et al. |
| 2014/0105685 A1 | 4/2014 | McFarland |
| 2014/0250579 A1 | 9/2014 | Slater et al. |
| 2017/0044784 A1 | 2/2017 | Slater et al. |
| 2017/0080348 A1 | 3/2017 | Mladick |
| 2017/0247895 A1 | 8/2017 | Webber |
| 2019/0203487 A1 | 7/2019 | Fincham et al. |
| 2019/0226223 A1 | 7/2019 | Slater et al. |

FOREIGN PATENT DOCUMENTS

| | | |
|---|---|---|
| AU | 2004240161 B1 | 4/2006 |
| CN | 1214402 A | 4/1999 |
| CN | 1231015 A | 10/1999 |
| CN | 101084352 A | 12/2007 |
| CN | 101387260 A | 3/2009 |
| CN | 201679617 U | 12/2010 |
| CN | 202248991 U | 5/2012 |
| CN | 103443374 A | 12/2013 |
| DE | 10 2005 003815 A1 | 8/2006 |
| JP | H0238667 A | 2/1990 |
| WO | WO-98/03753 A1 | 1/1998 |
| WO | WO-00/05464 A1 | 2/2000 |
| WO | WO-2005/023634 A2 | 3/2005 |
| WO | WO-2006/060866 A1 | 6/2006 |
| WO | WO-2008/034631 A1 | 3/2008 |
| WO | WO-2008/102035 A1 | 8/2008 |
| WO | WO-2010/059871 A1 | 5/2010 |

OTHER PUBLICATIONS

Certified English translation of: Boussinesq M.J., "Théorie de l'intumescence liquide, appelée onde solitaire ou de translation, se propageant dans un canal rectangulaire," C.-R. Acad. Sci. Paris, 72(1871), p. 755-59.

Extended European Search Report dated Jun. 16, 2014 for European patent application No. 14000139.7.

Lord Rayleigh. "On Waves." *The London, Edinburgh, and Dublin Philosophical Magazine and Journal of Science*, 5th Series, vol. 1, No. 4, Apr. 1876, pp. 257-279.

Pahl Dixon, "Some Guy's Dreams," *Surfing Magazine*, Western Empire Publications, San Clemente, California. Aug. 1998, five (5) pages.

PCT International Search Report and Written Opinion dated Dec. 20, 2013, issued by the International Searching Authority in connection with PCT application No. PCT/US2013/059498. 13 pages.

PCT International Search Report and Written Opinion dated Feb. 19, 2010, issued by the International Searching Authority in connection with PCT application No. PCT/US2009/065212. 16 pages.

WAVE GENERATOR SYSTEM AND METHOD FOR FREE-FORM BODIES OF WATER

CROSS REFERENCE TO RELATED APPLICATIONS

This application is a continuation of U.S. patent application Ser. No. 16/140,405, filed Sep. 24, 2018 entitled "Wave Generator System and Method for Free-Form Bodies of Water", which is a continuation of U.S. patent application Ser. No. 15/333,166 filed Oct. 24, 2016, entitled "Wave Generator System and Method for Free-Form Bodies of Water;" now U.S. Pat. No. 10,081,956, which is a continuation of U.S. patent application Ser. No. 14/286,807 filed May 23, 2014, entitled "Wave Generator System and Method for Free-Form Bodies of Water;" now U.S. Pat. No. 9,476,213, which is a continuation-in-part of U.S. patent application Ser. No. 14/071,514, filed Nov. 4, 2013, entitled "Surface Gravity Wave Generator And Wave Pool;" now U.S. Pat. No. 9,546,491, which is a continuation of U.S. patent application Ser. No. 13/609,239, filed Sep. 10, 2012, entitled "Surface Gravity Wave Generator And Wave Pool," now U.S. Pat. No. 8,573,887, which is a continuation of U.S. patent application Ser. No. 12/274,321, filed Nov. 19, 2008, entitled "Surface Gravity Wave Generator And Wave Pool," now U.S. Pat. No. 8,262,316; and this application also claims the benefit of priority under 35 U.S.C. § 119(e) of U.S. Provisional Application Ser. No. 61/827,457, filed May 24, 2013, titled "Wave Generator System and Method for Free-Form Bodies of Water," the disclosures of which are hereby incorporated by reference in their entirety herein.

BACKGROUND

Ocean waves have been used recreationally for hundreds of years. One of the most popular sports at any beach with well-formed, breaking waves is surfing. Surfing and other board sports have become so popular, in fact, that the water near any surf break that is suitable for surfing is usually crowded and overburdened with surfers, such that each surfer has to compete for each wave and exposure to activity is limited. Further, the majority of the planet's population does not have suitable access to ocean waves in order to even enjoy surfing or other ocean wave sports.

Another problem is that the waves at any spot are varied and inconsistent, with occasional "sets" of nicely formed waves that are sought after to be ridden, interspersed with less desirable and, in some cases, unrideable waves. Even when a surfer manages to be able to ride a selected wave, the duration of the ride lasts only a mere 2-30 seconds on average, with most rides being between 5 and 10 seconds long.

Ocean surface waves are waves that propagate along the interface between water and air, the restoring force is provided by gravity, and so they are often referred to as surface gravity waves. FIG. 1 illustrates the principles that govern surface gravity waves entering shallow water. Waves in deep water generally have a constant wave length. As the wave interacts with the bottom, it starts to "shoal." Typically, this occurs when the depth gets shallower than half of the wave's length, the wave length shortens and the wave amplitude increases. As the wave amplitude increases, the wave may become unstable as the crest of the wave is moving faster than the trough. When the amplitude is approximately 80% of the water depth the wave starts to "break" and we get surf. This run up and breaking process is dependent on the slope angle and contour of the beach, the angle at which the waves approach the beach, and the water depth and properties of the deep water waves approaching the beach. Refraction and focusing of these waves is possible through changes to the bottom topography.

Ocean waves generally have five stages: generation, propagation, shoaling, breaking, and decay. The shoaling and breaking stages are the most desirable for rideable waves. The point of breaking being strongly dependent on the ratio of the water depth to the wave's amplitude but also depends on the contour, depth and shape of the ocean floor. In addition, velocity, wavelength and height of the wave, among other factors, can also contribute to the breaking of a wave. In general, a wave can be characterized to result in one of four principal breaker types: spilling, plunging, collapsing, and surging. Of these wave types the spilling waves are preferred by beginner surfers while the plunging waves are revered by more experienced surfers. These breaker types are illustrated in FIG. 2.

Various systems and techniques have been tried to replicate ocean waves in a man-made environment. Some of these systems include directing a fast moving, relatively shallow sheet of water against a solid sculpted waveform to produce a water effect that is ridable but is not actually a wave. Other systems use linearly-actuated paddles, hydraulics or pneumatics caissons or simply large controlled injections of water to generate actual waves. However, all of these systems are inefficient in transferring energy to the "wave", and none of these systems, for various reasons and shortcomings, have yet to come close to generating a wave that replicates the desired size, form, speed and break of the most desirable waves that are sought to be ridden, i.e. waves entering shallow water that plunge, breaking with a tube and which have a relatively long duration and sufficient face for the surfer to maneuver.

SUMMARY

This document presents a wave generator system and wave pool that generates surface gravity waves that can be ridden by a user on a surfboard. In particular, this document describes an apparatus, method, and system to generate waves of a desired surfability in free-form bodies of water, such as an ocean, a lake (natural or man-made), a pond (natural or man-made), or the like. The apparatus, method and system described herein generates waves in a body of water without a side wall.

In one aspect, a wave park for an open or large body of water is disclosed. The wave park includes a body of water, and a track positioned in or proximate the body of water. The wave park further includes at least one foil coupled to move along the track, the at least one foil being at least partially submerged in the body of water. The at least one foil has a curvilinear cross-sectional geometry that includes a leading surface that is concave about a vertical axis to provide drag to generate a primary wave laterally in water of the body of water that contacts the leading surface of the foil, and a trailing surface that narrows from a maximum width of the foil adjacent the leading surface to a point at an end of the foil, the trailing surface to decrease the drag of the foil and to minimize oscillatory waves that trail the primary wave from the water moving past the leading surface of the foil.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
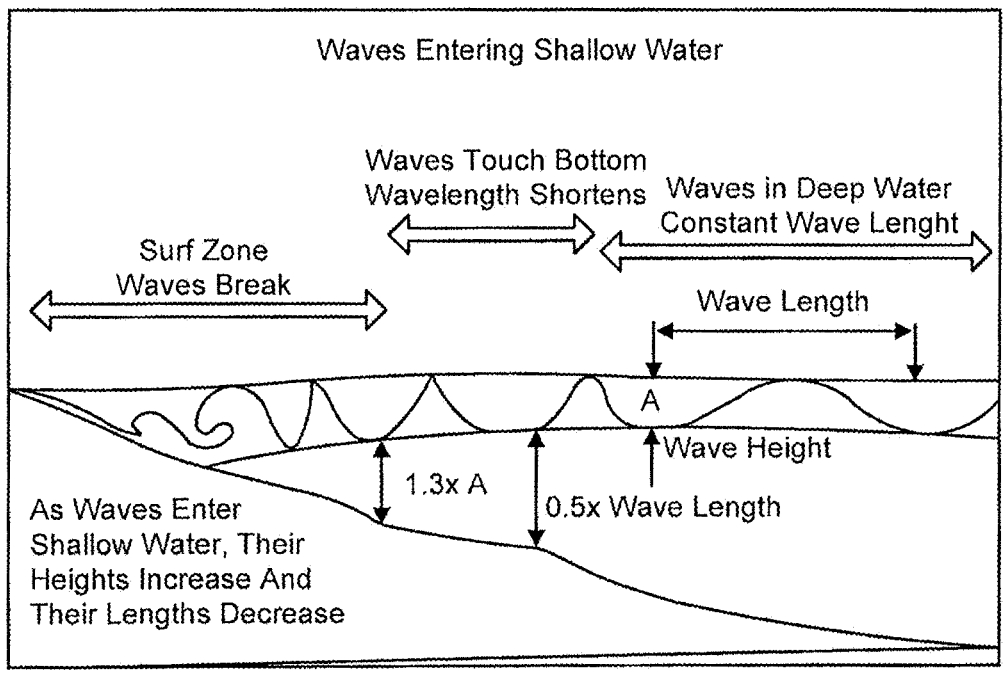
FIG. 1 depicts properties of waves entering shallow water.
Figure 2:
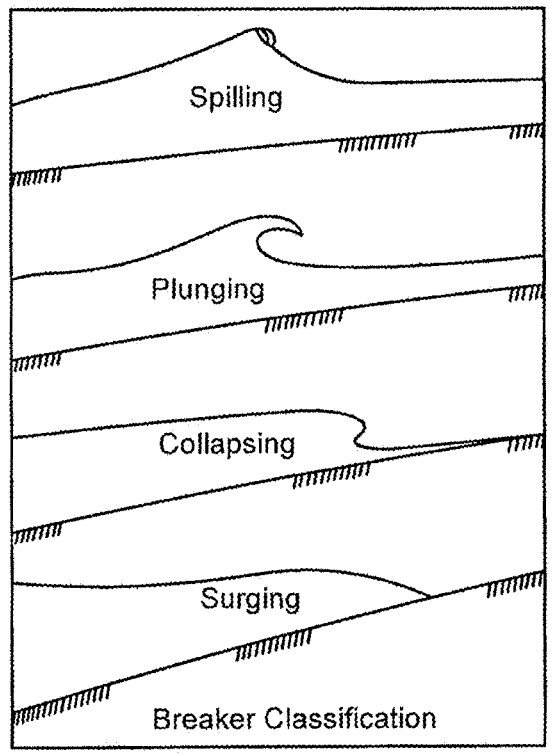
FIG. 2 illustrates four general types of breaking waves.

This document describes an apparatus, method, and system to generate waves of a desired surfability. Surfability depends on wave angle, wave speed, wave slope (i.e. steepness), breaker type, bottom slope and depth, curvature, refraction and focusing. Much detail is devoted to solitary waves as they have characteristics that make them particularly advantageous for generation by the apparatus, method and system presented here. As used herein, the term "solitary wave" is used to describe a shallow water wave, or "surface gravity wave" having a single principal displacement of water above a mean water level. A solitary wave propagates without dispersion. It very closely resembles the type of wave that produces favorable surf in the ocean. A theoretically-perfect solitary wave arises from a balance between dispersion and nonlinearity, such that the wave is able to travel long distances while preserving its shape and form, without obstruction by counteracting waves. A wave form of a solitary wave is a function of distance x and time t, and can be characterized by the following equation:

$$\eta(x,t) = A \operatorname{sech}_0^2\left(\sqrt{\frac{3A}{4h_0^3}}\left(x - t\sqrt{g(h_0 + A)}\right)\right)$$

where A is the maximum amplitude, or height, of the wave above the water surface, $h_0$ is the depth of the water, g is the acceleration of gravity and $\eta(x,t)$ is the height of the water above $h_0$. The length of a solitary wave, while theoretically infinite, is limited by water surface elevation, and can be defined as:

$$L = \frac{2\pi}{k} \text{ where } k = \sqrt{\frac{3A}{4h_0^3}}$$

Pools

The systems, apparatuses and methods described herein use a pool of water in which solitary type or other surface gravity waves are generated. In some preferred implementations, the pool can be circular or annular, being defined by an outer wall or edge that has a diameter of 200 to 800 feet or more. Alternatively, a round or circular pool having a diameter of less than 200 feet can be used, however, a diameter of 450 to 550 feet may be preferred. In one exemplary implementation, the pool can be annular with a center circular island that defines a channel or trough. In this annular configuration, the pool has an outer diameter of 550 feet and a channel width of at least 50 feet, although the channel can have a width of 150 feet or more, which can yield 30-100 feet of rideable wave length.

In another exemplary implementation, the pool can be a contiguous basin such as a circular pool without a center island. In the circular configuration, the pool can have a bottom that slopes up toward the center to a shoal or sill, and may include a deeper trough or lead to a shallow sill or flat surface. In yet other implementations, the pool can be any closed-loop, curvilinear channel, such as a racetrack shape (i.e. truncated circle), oval, or other rounded shape. In still other implementations, the pool can include an open or closed looped linear or curvilinear channel through which water is flowed (such as a crescent shape or a simple linear canal), and which may or may not use a water recapture or recirculation and flow mechanism.

Figure 3A:
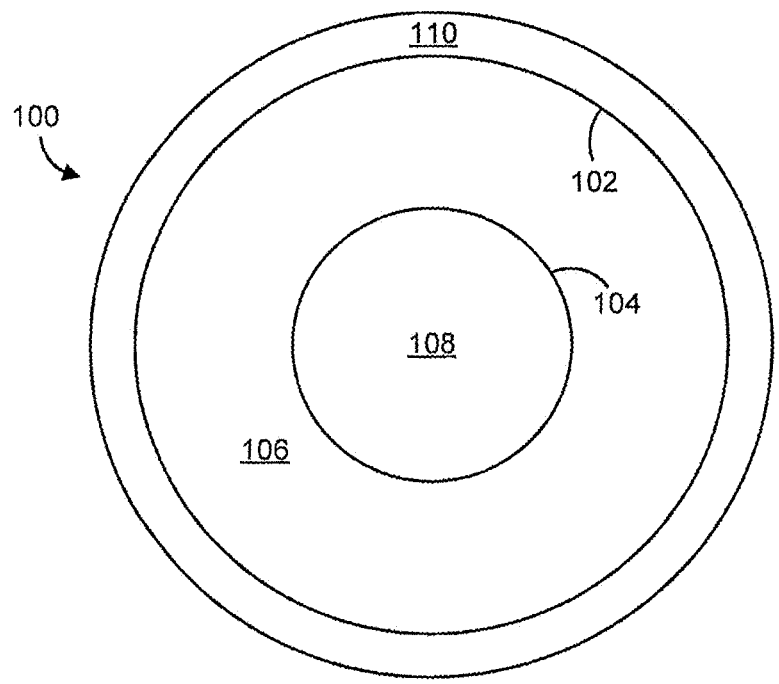
FIGS. 3A and 3B are a top and side view, respectively, of a pool having an annular shape.
Figure 3B:
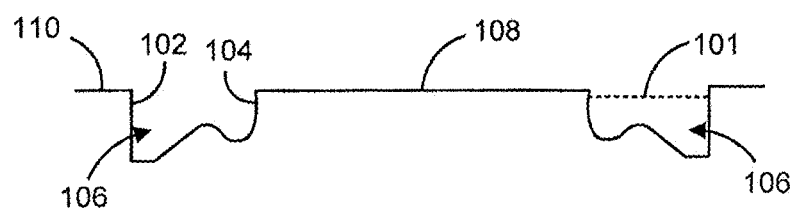

FIGS. 3A and 3B are top and cross-sectional views, respectively, of a pool 100 in accordance with an annular implementation. Pool 100 has a substantially annular shape that is defined by an outer wall 102, an inner wall 104, and a water channel 106 between and defined by the outer wall 102 and the inner wall 104. In annular implementations, the outer wall 102 and inner wall 104 may be circular. The inner wall 104 can be a wall that extends above a mean water level 101 of the water channel 106, and can form an island 108 or other type of platform above the mean water level 101. The inner wall 104 may also be inclined so as to form a sloping beach. Alternatively, the inner wall 104 may form a submersed reef or barrier between the water channel 106 and a second pool. For example, the second pool can be shallow to receive wash waves resulting from waves generated in the water channel 106. Pool 100 can further include a side 110 which, according to some implementations, can include a track such as a monorail or other rail for receiving a motorized vehicle. In addition, the vehicle can be attached to at least one wave generator, preferably in the form of a movable foil, as will be described further below. In some implementations, outer wall 102, with or without cooperation with the side 110, can host a wave generator in the form of a flexible wall or rotating wall with built-in foils, as will also be described further below.

Wave Generator

Figure 4:
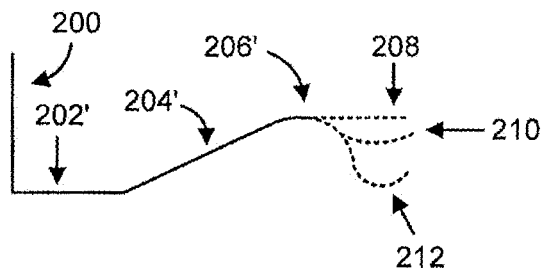
FIG. 4 illustrates an embodiment of a bottom contour of a pool.

FIG. 4 illustrates a bottom contour of a pool having a critically-sloped beach design. The bottom contour of the pool having the critically-sloped design may be implemented in any number of shaped pools, including pools that are linear, curvilinear, circular, or annular. The bottom contour can include a side wall 200 which can be an inner side wall or an outer side wall. The side wall 200 can have a height that at least extends higher than a mean water level, and can extend above a maximum amplitude, or height, of a generated wave. The side wall 200 can be adapted to accommodate a wave generator, such as a foil that is vertically placed on the side wall 200 and moved laterally along the side wall 200. The bottom contour can further include a deep region 202, which in some configurations extends at least long enough to accommodate the thickness, or height, of the foil. The intersection of the side wall 200 and the deep region 202 may also include a slope, step or other geometrical feature, or a track/rail mechanism that participates in guiding or powering the motion of the foil. A swell can be produced to have an amplitude up to the same or even greater than the depth of the deep region 202.

The bottom contour of the pool can further include a slope 204 that rises upward from the deep region 202. The slope 204 can range in angle from 1 to 16 degrees, and also from 5 to 10 degrees. The slope 204 can be linear or curved, and may include indentions, undulations, or other geometrical features. The bottom contour can further include a shoal 206 or sill. The surface from a point on the slope 204 and the shoal 206 can provide the primary break zone for a generated wave. Wave setup in the break zone can change the mean water level. The shoal 206 can be flattened or curved, and can transition into a flattened shallow planar region 208, a shallow trench 210, or a deep trench 212, or any alternating combination thereof. The basin side opposite the wave generator ultimately ends in a sloping beach.

The shoal 206 can also be an extension of the slope 204 and terminate directly into a beach. The beach may be real or artificial. The beach may incorporate water evacuation systems which can include grates through which the water can pass down into. The water evacuation systems may be linked to the general water recirculation and/or filtering systems, any may incorporate more advanced flow redirection features. The beach may also incorporate wave damping baffles that help to minimize the reflection of the waves and reduce along shore transport and currents.

The bottom contour can be formed of a rigid material and can be overlaid by a synthetic coating. In some implementations, the bottom may be covered with sections of softer more flexible materials, for example a foam reef or covering may be introduced that would be more forgiving during wipeouts. For example, the coating can be thicker at the shoal 206 or within the break zone. The coating can be formed of a layer that is less rigid than the rigid material used for the bottom contour, and may even be shock dampening. The slope 204, shoal 206 and/or other regions of the bottom contour can be formed by one or more removable inserts. Further, any part of the bottom contour may be dynamically reconfigurable and adjustable, to change the general shape and geometry of the bottom contour. For example, the bottom contour may be changed on-the-fly, such as with the assistance of motorized mechanics, inflatable bladders, simple manual exchange, or other similar dynamic shaping mechanisms. In addition, removable inserts or modules can be connected with a solid floor making up a part of the pool, including the bottom contour. The inserts or modules can be uniform about the circle, or variable for creating recurring reefs defined by undulations in the slope 204 or shoal 206. In this way particular shaped modules can be introduced at specific locations to create a section with a desirable surf break.

Figure 5:
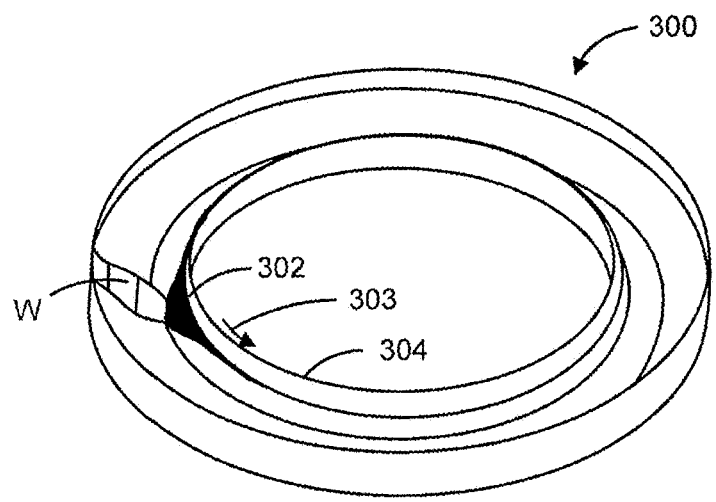
FIG. 5 illustrates an embodiment of a pool in an annular configuration, and a wave generator on an inner wall of the pool.
Figure 6:
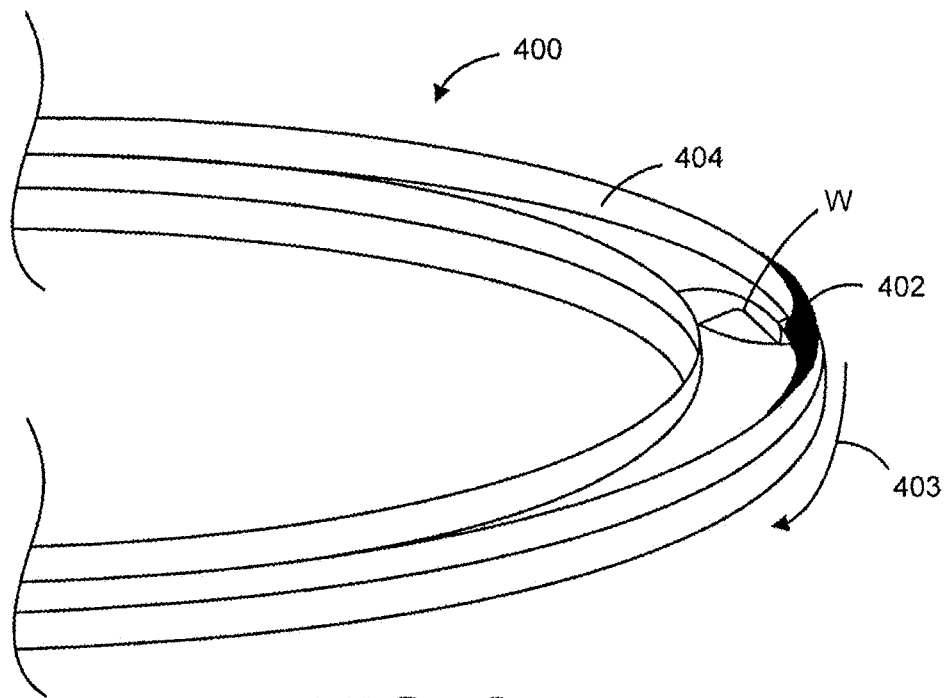
FIG. 6 illustrates an embodiment of a section of a pool in an annular configuration having a wave generator arranged vertically along an outer wall.

FIG. 5 illustrates a pool 300 in an annular configuration, and a wave generator 302 on an inner wall 304 of the pool 300. The wave generator 302 can be a foil arranged vertically along the inner wall 304, and moved in the direction 303 indicated to generate a wave W. FIG. 6 illustrates an example section of a pool 400 in an annular configuration having a wave generator 402 arranged vertically along an outer wall 404. The wave generator 402 can be moved in the direction 403 indicated, to generate a wave W as shown. In some implementations, the outer wall 404 placement of the wave generator 402 can enable improved focusing and larger waves than an inner wall placement. Additionally, in some implementations, inner wall placement can enable reduced wave speed and improved surfability. The wave generators 302 and 402 can be moved by a powered vehicle or other mechanism that is generally kept dry and away from the water, such as on a rail or other track, part of which may be submerged. In some implementations the entire rail can rotate, allowing for the possibility of keeping the drive motors in the non-rotating frame.

The wave generators may also be configured to run in the center of the channel in which case there would be beaches on both the inner and outer walls and the track/rail mechanism would be supported either from an overhead structure or by direct attachment to the floor of the pool.

Foils

Some implementations of the wave pools described herein can use one or more foils for generating waves of a desired surfability. The foils can be shaped for generating waves in supercritical flow, i.e. the foils move faster than the speed of the generated waves. This can allow for significant peel angle as the wave is inclined with the radius. The speed of a wave in shallow water (when the water depth is comparable to the wave length) can be represented by $V_W$:

$$V_W = \sqrt{g(h_0 + A)}$$

where g is the force of gravity, and $h_0$ is the depth of the water and A in the wave amplitude. Criticality can be represented by the Froude number (Fr), in which a number greater than 1 is supercritical, and a number less than 1 is subcritical:

$Fr = V_F/V_W$, where $V_F$ is the velocity of the foil relative to the water

The foils can be adapted to propagate the wave away from a leading portion of the foil as the water and foil move relative to each other. This movement may be able to achieve the most direct transfer of mechanical energy to the wave. In this manner, ideal swells can be formed immediately adjacent to the leading portion of the foil. The foils can be optimized for generating the largest possible swell height for a given water depth. However, some foils can be configured to generate smaller swells.

In order to achieve the best energy transfer from the foil to the wave and to ensure that the generated swell is clean and relatively solitary, the foils can be designed to impart a motion to the water that is close to a solution of a known wave equation. In this way it may not be necessary for the wave to have to form from a somewhat arbitrary disturbance as is done with some other wave generation systems. The proposed procedure can rely on matching the displacement imparted by the foil at each location to the natural (theoretical) displacement field of the wave. For a fixed location through which the foil will pass P, the direction normal to the foil can be x and the thickness of the part of the foil currently at P can be X(t).

The rate of change of X at the point P may be matched with the depth averaged velocity of the wave $\bar{u}$. This can be shown expressed in equation (1).

$$\frac{dX}{dt} = \bar{u}(X, t) \quad (1)$$

Applying the change of variable from (x,t) to (θ=ct−X,t) where c is the phase speed of the wave.

$$\frac{dX}{d\theta} = \frac{\bar{u}(\theta(X))}{c - \bar{u}(\theta(X))} \quad (2)$$

In equation (2) the depth averaged velocity of the wave $\bar{u}$ can be given by any of a number of different theories. For the case of solitary waves, which generally take the form of equation 3 and 4 below, several examples can be provided. This technique of foil design may also apply to any other form of surface gravity wave for which there is a known, computed, measured or approximated solution.

$$\eta(\theta) = A \operatorname{sech}^2(\beta\theta/2) \quad (3)$$

$$\bar{u}(\theta) = \frac{c\eta(\theta)}{h_o + \eta(\theta)} \quad (4)$$

Here η(θ) is the free surface elevation from rest, A is the solitary wave amplitude, $h_0$ is the mean water depth, β is the outskirts decay coefficient, c is the phase speed, and ü(θ) is the depth averaged horizontal velocity. C and β can differ for different solitary waves.

Combining equations (2) and (3) with (4) can give the rate of change of the foil thickness in time at a fixed position (5), and can be related to the foil shape X(Y), through the foil velocity $V_F$, by substituting $t=Y/V_F$ $$X(t) = \frac{2A}{h_0\beta}\tanh[\beta(ct - X(t))/2] \quad (5)$$

A maximum thickness of foil can be given from (5) as:

$$T_F = \frac{4A}{h_0\beta}$$

The length of the active section of the foil can then be approximated as:

$$L_F = \frac{4}{\beta c}\left(\tanh^{-1}\left(.99 + \frac{A}{h_o}\right)\right)$$

Values for C and β corresponding to the solitary wave of Rayleigh can be:

$$\frac{\beta_R}{2} = \sqrt{\frac{3A}{4h_o^2(A + h_o)}} \text{ and } c_R = \sqrt{g(A + h_o)}$$

In this example for small displacements after linearization the foil shape X(Y), can be approximated as.

$$X_R(Y) = \frac{2A}{h_o\beta_R}\frac{h_o\tanh(\beta_R c_R Y/2V_F)}{h_o + A[1 - \tanh^2(\beta_R c_R Y/2V_F)]}$$

This solution can also be approximated with a hyperbolic tangent function. These foil shapes, as described by at least some of the mathematical functions, would have extremely thin leading edges which would be structurally unstable. The actual leading edges would be truncated at a suitable thickness typically of 3-12 inches, and rounded to provide a more rigid leading edge. The rounding may be symmetrical or not and in some implementations may loosely follow the shape of an ellipse.

Figure 7A:
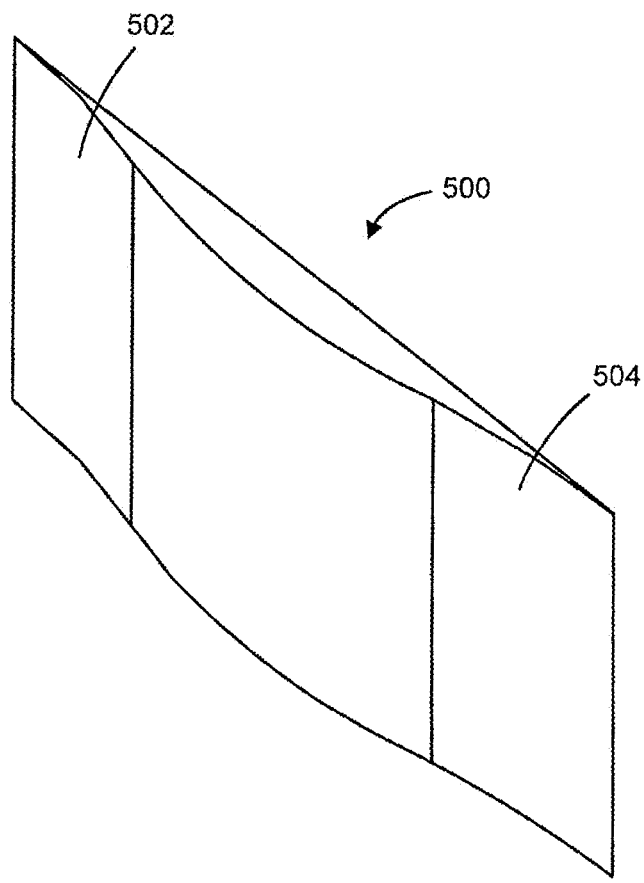
FIGS. 7A and 7B are a perspective view and cross-sectional view, respectively, to illustrate an embodiment of a shape of a foil for a linear section of wall.
Figure 7B:
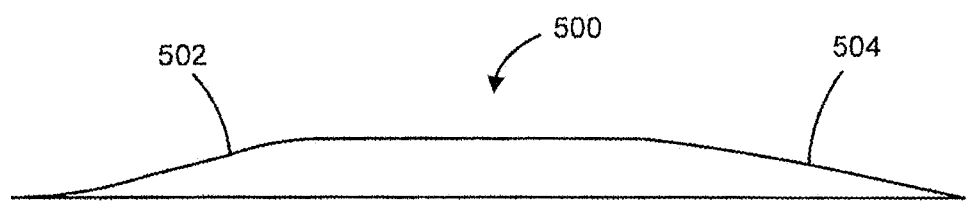
Figure 8A:
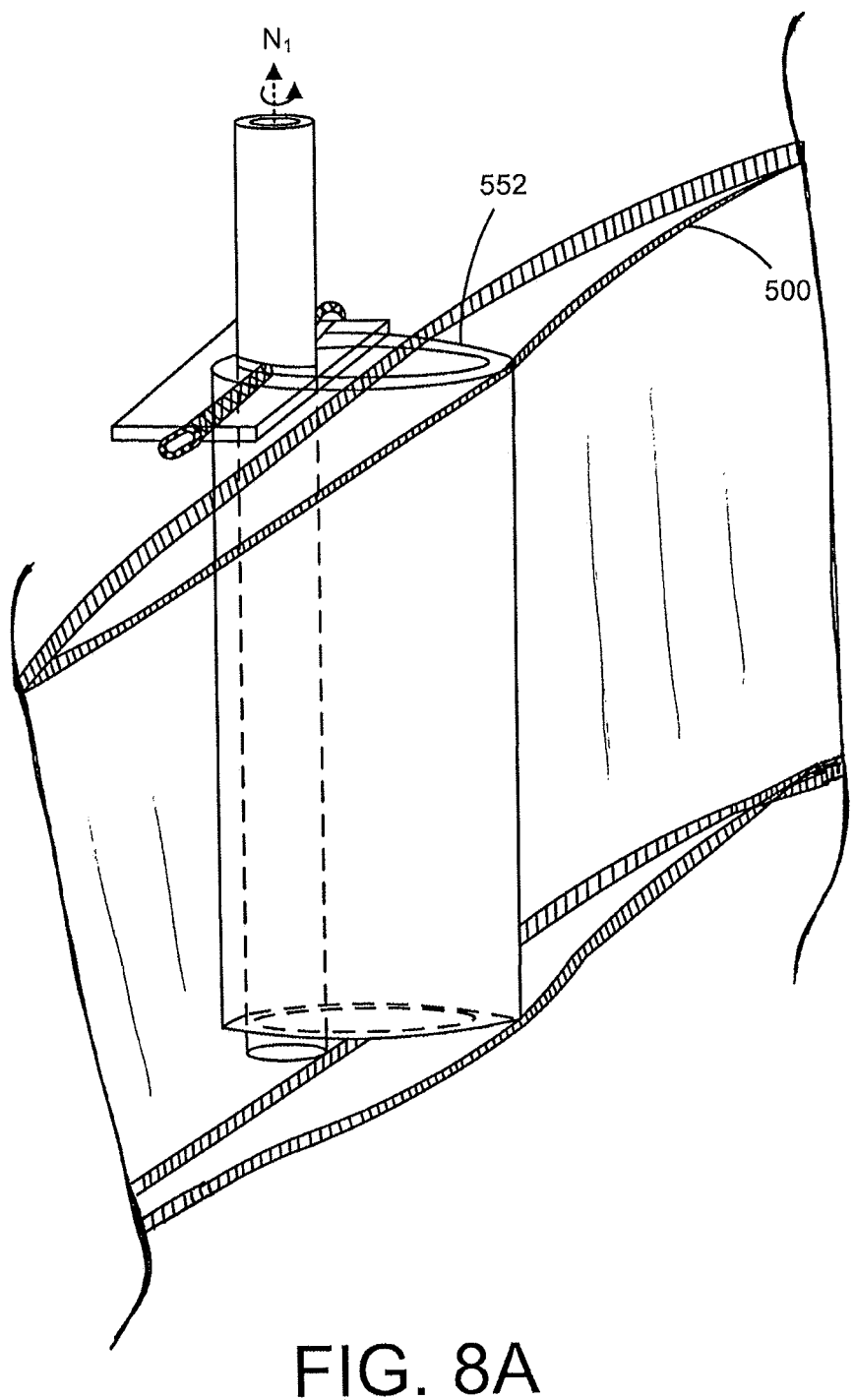
FIG. 8A illustrates a section of an embodiment of a foil 500 including an eccentric roller.
Figure 8B:
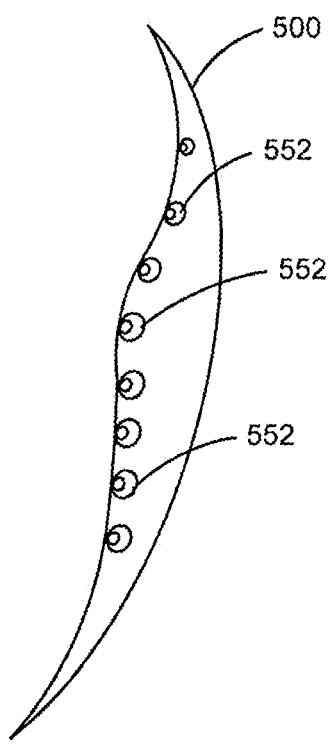
FIGS. 8B and 8C illustrate an embodiment of a foil 500 with several morphing rollers.
Figure 8C:
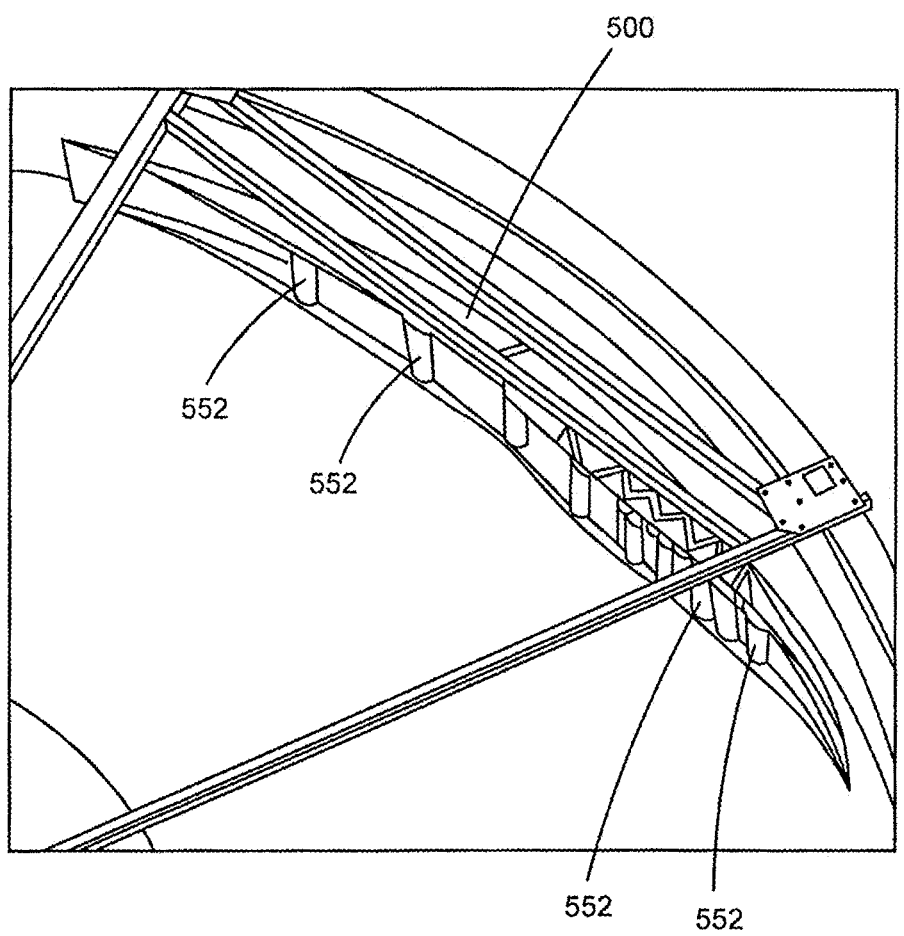

As shown in an exemplary configuration in FIGS. 7A and 7B, the foils 500 are three-dimensional, curvilinear shaped geometries having a leading surface 502, or "active section X(Y)," that generates a wave, and a trailing surface 504 that operates as a flow recovery to avoid separation of the flow and to decrease the drag of the foil 500 for improved energy efficiency. The foil 500 is shown by way of example as configured for towing in a linear canal and hence has a flat surface which would be adjacent to the vertical wall of the canal. The foil 500 can be shaped to get most of the energy into the primary, solitary wave mode, and minimize energy into oscillatory trailing waves. As such, the foil 500 can promote a quiescent environment for a following wave generator and foil, if any. Each foil 500 may contain internal actuators that allow its shape to morph to produce different waves, and/or can articulate so as to account for changes in curvature of the outer wall in non-circular or non-linear pools. In some implementations the morphing of the foil 500 can allow for the reversal of the mechanism to generate waves by translating the foil 500 in the opposite direction. The morphing can be accomplished by a series of linear actuators or by fitting several vertical eccentric rollers 552 (as shown in FIGS. 8A-8C) under the skin of the wave generating face of the foil 500. A sketch of a foil 500 including an eccentric roller 552 is shown in FIG. 8A. The skin of the wave generating face of the foil 500 is shown in FIG. 8A as being transparent for purposes of showing the eccentric roller 552. In addition, a foil 500 with several morphing rollers 552 is shown in FIG. 8B, 8C. Similar to FIG. 8A, the skin of the wave generating face of the foil 500 is shown in FIG. 8C as being transparent for purposes of showing the several morphing rollers 552. Rollers 552 can also be added in the location of the foil 500 having either the maximum thickness or the recovery. In some implementations of the foil 500, the flexible layer may be formed as a relatively rigid sheet that slides horizontally as the foil changes shape. In addition, some implementations may include a specific fixture consisting of a slotted grove that can take up the slack in the relatively rigid sheet through spring or hydraulic tension devices that stretch the relatively rigid sheet along the length of the foil 500. The ability to morph the shape of the foil 500 can allow for large variation in the size and shape of the generated swells, and allow for optimization of the foil 500 shape to generate the desired swell shape. This fine optimization can be necessary due to other viscous fluid mechanical phenomenon at play in the boundary layer that develop over the surface of the foil 500. The attached boundary layer can have the effect of slightly changing the effective shape of the hydrofoil. In other implementations there may be specific surface roughness or "a boundary layer trip" installed on the surface of the hydrofoil. In particular, the physical length of the hydrofoils may be reduced if sufficient turbulence is generated on the recovery section to ensure there is no flow separation, and the strongly turbulent boundary layer will not be separated so easily in an adverse pressure gradient.

In some implementations, the foils 500 are shaped and formed to a specific geometry based on a transformation into a function of space from an analogy to an equation as a function of time. Hyperbolic tangent functions that mathematically define the stroke of a piston as a function of time, such that the piston pushes a wave plate to create a shallow water wave that propagates away from the wave plate. These hyperbolic tangent functions consider the position of the wave plate relative to the position of the generated wave in a long wave generation model, and produce an acceptable profile for both solitary and conidial waves. These techniques can be used to generate any propagating surface gravity wave accounting for the propagation of the wave away from the generator during generation (i.e. adapt to how the wave is changing during generation). Compensation for movement of the generator over time and the specific shape of the recovery section can assist in removing trailing oscillatory waves, which can provide a more compact and efficient generation process. Other types of waves to those discussed here can be defined.

The thickness of the foil can be related to the amplitude (height) of the wave and the depth of the water. Accordingly, for a known depth and a desired amplitude A, it can be determined that a thickness of the foil, $F_r$, can be given approximately by:

For a Rayleigh solitary wave:

$$F_T = 4\sqrt{\frac{A(A+h_o)}{3}}$$

For a Boussenesq solitary wave:

$$F_T = 4\sqrt{\frac{Ah_o}{3}}$$

For shallow water, second order solitary wave:

$$F_T = 4\sqrt{\frac{A(A+h_o)}{3}}\left(1+\frac{A}{h_o}\right)$$

Figure 9:
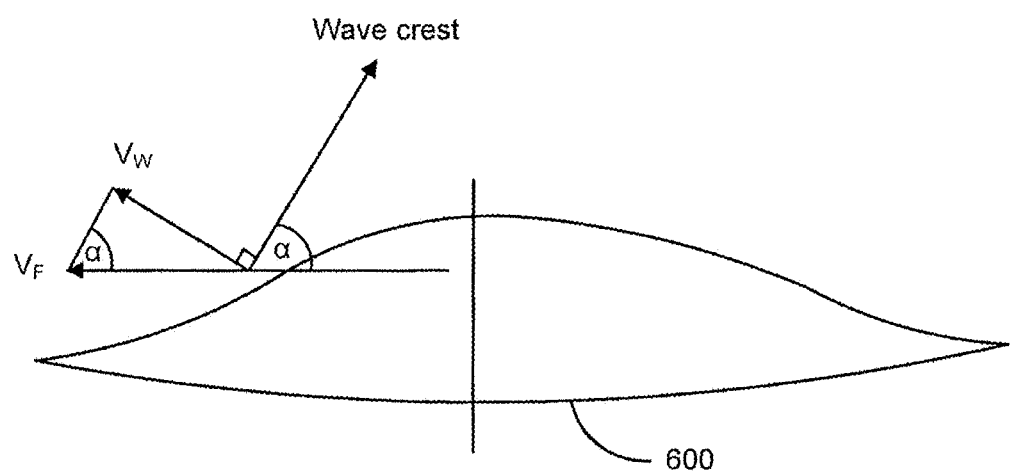
FIG. 9 shows the relative geometry of the velocity of the wave propagation with respect to the foil velocity.

FIG. 9 shows a cross-sectional geometry of a foil 600. As a three-dimensional object, the foil 600 can generate a wave having a propagation velocity and vector $V_W$, based on the speed and vector of the foil $V_F$. As the foil moves in the direction shown, and dependent on its speed, the wave will propagate out at a peel angle $\alpha$, given by $\sin \alpha = Fr^{-1}$, so for a given water depth and wave height the peel angle can be determined by the speed of the foil, with larger speeds corresponding to smaller peel angles. The smaller the peel angle, the longer the length of the wave crest will be across the pool.

Figure 10:
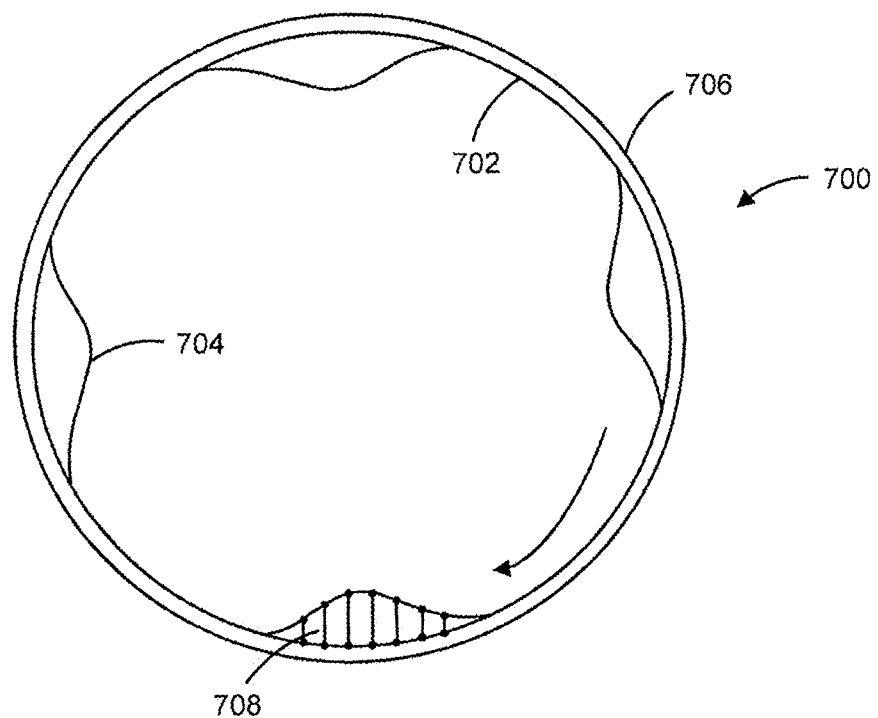
FIG. 10 illustrates an embodiment of a wave generator pool in which a rotating inner wall is positioned within a fixed outer wall.

FIG. 10 illustrates a wave generator 700 in which a rotating inner wall 702 is positioned within a fixed outer wall 706. The rotating inner wall 702 can be equipped with one or more fixed foils 704 that can be the same size and shape as the foils described above. These embedded foils 704 may have internal actuators 708 which can assist in allowing the embedded foils 704 to morph and change shape, such as according to a variety of the cross-sectional shapes described above. The change in cross-sectional shapes can accommodate "sweet spots" for different speeds and water depths. These actuators can function is a way similar to the morphing eccentric rollers shown in FIG. 8.

Figure 11:
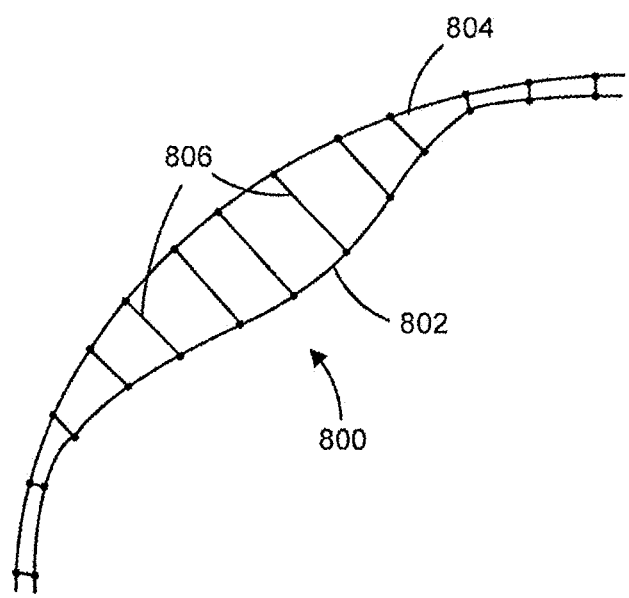
FIG. 11 illustrates an embodiment of a wave generator in which a flexible layer is placed on an outer wall, and the outer wall includes a number of linear actuators for being arranged around the entire length or circumference of the outer wall.

FIG. 11 illustrates a wave generator 800 in which a flexible layer 802 is placed along an outer wall 804, and the outer wall 804 can include a number of linear actuators 806 arranged around at least a majority of the length or circumference of the outer wall 804. In addition, the linear actuators 806 can also be attached to the flexible layer 802. The flexible layer 802 can be formed out of any number of flexible materials, including rubber or materials similar to rubber. The linear actuators 806 can be mechanical or pneumatic actuators, or other devices that have at least a radial expansion and retraction direction, such as a series of vertically aligned eccentric rollers. The linear actuators 806 can be actuated in order to form a moving shape in the flexible layer 802 that approximates the shape of the foils as described above. The foil shape can propagate along the outer wall 804 or flexible layer 802 at a velocity $V_F$.

Figure 12:
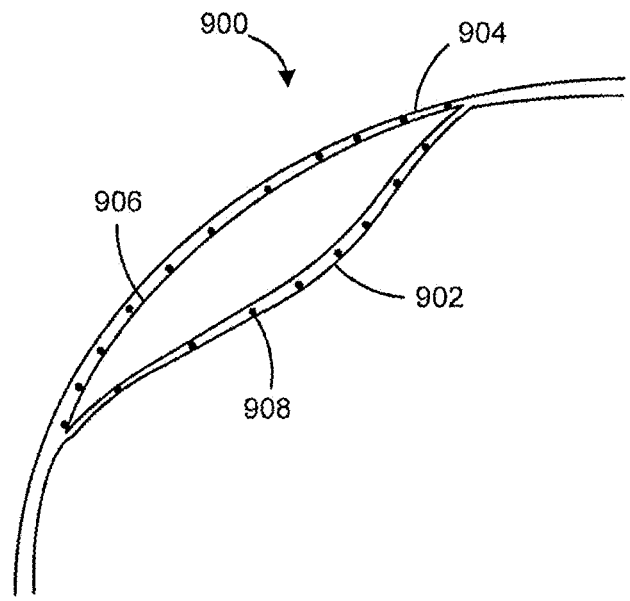
FIG. 12 illustrates an embodiment of a wave generator having a flexible layer placed on an outer wall.

FIG. 12 illustrates an implementation of a wave generator 900 including a flexible layer 902 positioned along an outer wall 904. The gap in-between the flexible layer 902 and the outer wall 904 can define a moving foil 906, similar to as described above, and can includes one or more rollers 908 in tracks that can connect to both the outer wall 904 and flexible layer 902. The rollers 908 in tracks can allow the foil 906 formed in the gap to travel smoothly in a direction along the outer wall 904. This moving foil 906 can produce a radial motion of the flexible layer 902 that at least closely approximates the shapes of one or more foils described above.

Figure 13:
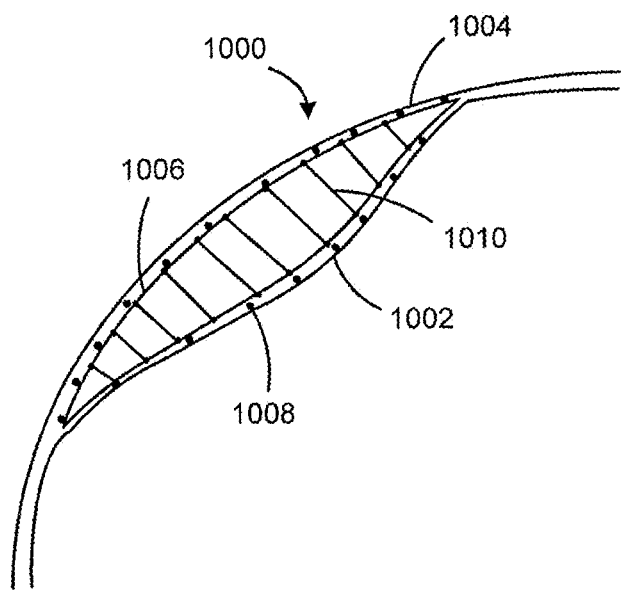
FIG. 13 illustrates an embodiment of a wave generator that includes a flexible layer that can be raised away from the outer wall to define a foil.

FIG. 13 illustrates a wave generator 1000 that includes a flexible layer 1002 that can be raised away from the outer wall 1004 to define a foil 1006. The foil 1006 can include internal actuators or eccentric rollers 1010 that allow it to morph the shape of the foil 1006, which may change depending on the direction of movement along the outer wall 1004. The defined foil 1006 can move via rollers 1008 on tracks, such as those described above. Accordingly, the flexible layer 1002 can be shaped to approximate the foils described above while shielding actuators and rollers 1008 on tracks from water. This configuration may also diminishing the risk of a separate moving foil in which body parts can be caught.

Virtual Bottom

In some implementations, a system of jets positioned near the bottom of the pool on the slope can simulate the water being shallower than it actually is which can allow the wave to break in deeper water than what could otherwise be achieved. These jets may be positional so as to generate both mean flow and turbulence at a required level. The distribution of these jets may change both radially and in the direction from the outer wall towards the beach with more jets on the beach. There may also be azimuthal variation in the nature and quantity of the jets. This jet system may be incorporated with both the filtering system and the wave system to provide mean flow or lazy river mitigation. Roughness elements may be added to the bottom of the pool to promote the generation of turbulence that may promote changes in the form of the breaking wave. The distribution and size of the roughness elements can be a function of both radius and azimuth. The roughness elements may take the form of classical and novel vortex generators and are described below.

Mean Flow

A moving foil or set of foils within a pool, particularly a circular basin as described above, will eventually generate a mean flow or "lazy river" effect, where water in the pool will develop a slight current in the direction of the one or more moving foils.

In other implementations, a pool can include a system to provide or counter a mean flow or circulation. The system may include a number of flow jets through which water is pumped to counter or mitigate any "lazy river" flow created by the moving foils, and/or help to change the shape of the breaking wave. The mean circulation may have vertical or horizontal variability. Other mean flow systems may be used, such as a counter-rotational opposing side, bottom or other mechanism.

Passive "Lazy River" Flow Control

Figure 15:
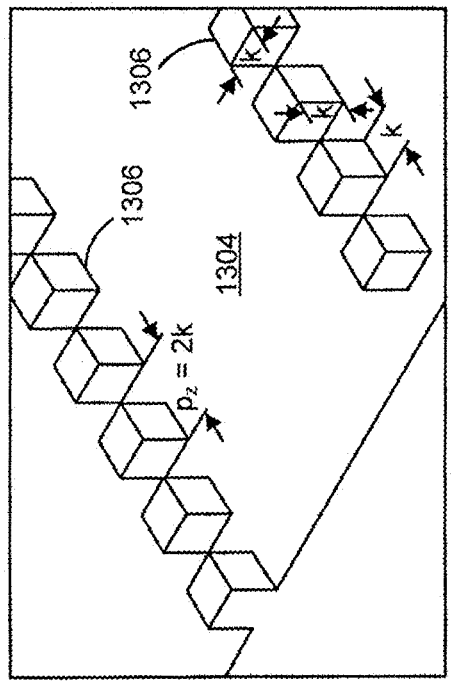
FIG. 15 illustrates another embodiment of a vortex generator having squared members spaced-apart both widthwise and length-wise.
Figure 14:
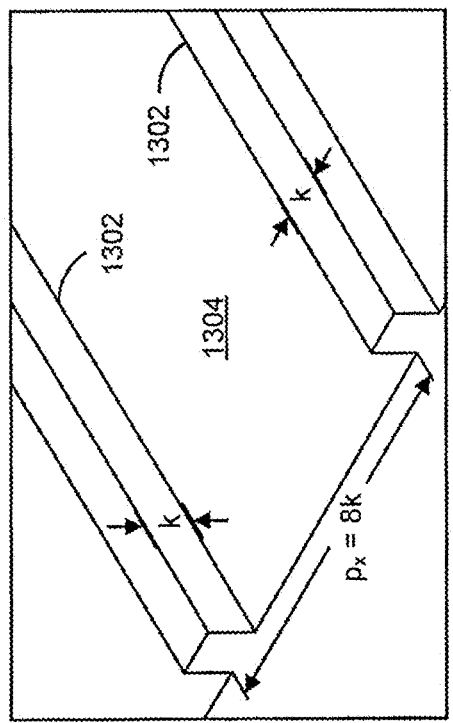
FIG. 14 illustrates an embodiment of vortex generators having elongated members with a square cross section.
Figure 16:
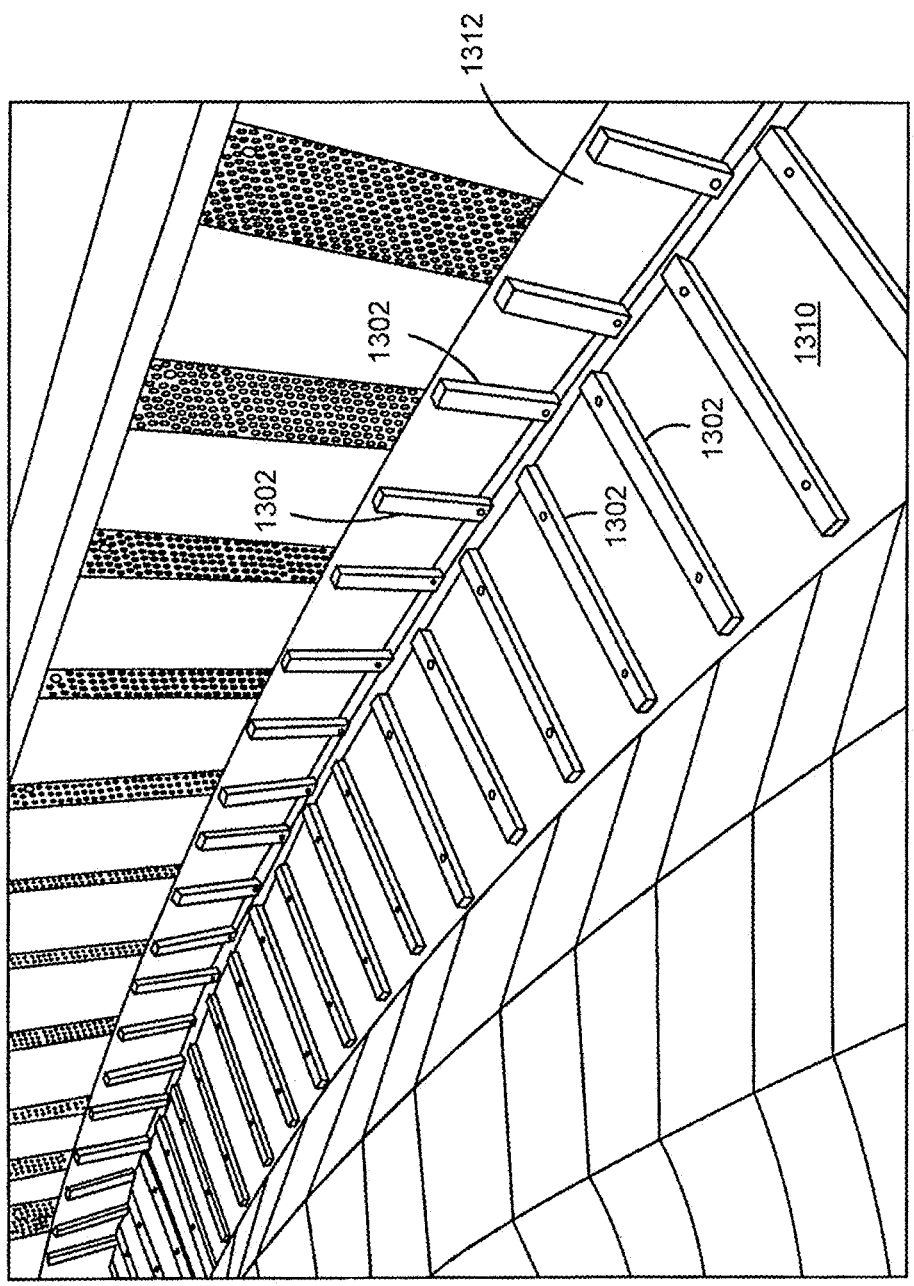
FIG. 16 illustrates an embodiment of vortex generators mounted both on a bottom section adjacent to an outer gutter of the basin, and on a lower portion of an outer gutter wall of the basin.

FIGS. 14-16 illustrate various passive mechanisms that can be added to select surfaces of the pool, particularly in the deep area under and beside the foil, as turbulence-generating obstacles to the mean flow of azimuthal and radial currents which can mitigate the mean flow induced by the moving foils.

In some implementations, as shown in FIG. 14, a number of vortex generators 1302 are provided to a surface 1304 of a pool, such as on a bottom of the pool or a side wall of the basin. The vortex generators 1302 can be placed in areas behind a safety fence at an outer side of the pool proximate the moving foils, such as where surfers will not likely come into contact with them. Alternatively or in addition, vortex generators 1302 can be placed in the basin surface of the pool where surfing takes place, especially if the vortex generators 1302 are part of a safety feature, such as being made out of a soft material such as foam to protect against impact to the surface by a surfer. The vortex generators 1302 can be positioned and spaced apart incrementally on the surface 1304, such as a floor of the basin of the pool, as shown in FIGS. 14 and 15, and/or can be positioned on the side wall of the pool, as shown in FIG. 16.

Figure 17:
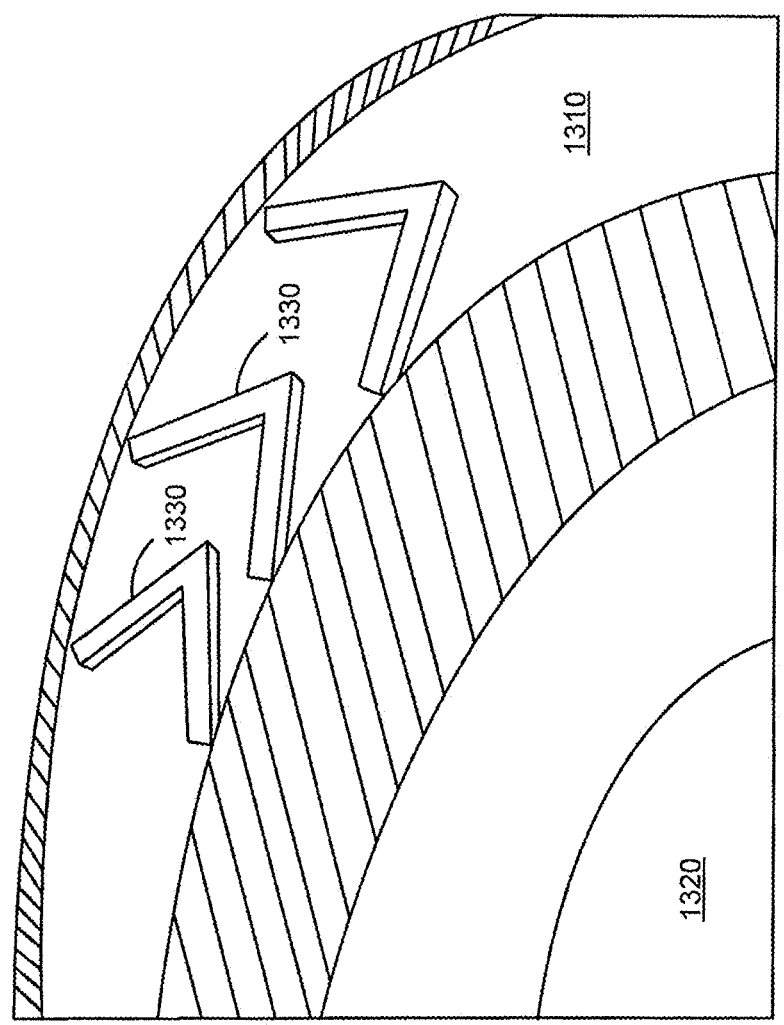
FIG. 17 illustrates an embodiment of vortex generators having non-linear shapes, such as being angled or curved.

FIG. 14 illustrates an implementation of vortex generators 1302 having elongated members with a square cross section. Additionally, the vortex generators can be spaced-apart at an increment, such as a space of 8 times the cross-sectional width k of each vortex generator 1302 ($p_x=8k$). FIG. 15 illustrates another implementation of a vortex generator 1306 having squared members spaced-apart both width-wise (i.e., 8 times the cross-sectional width k), and length-wise (i.e. every other cross-sectional length, $p_z=2k$). FIG. 16 illustrates vortex generators 1302 mounted both on a bottom section adjacent to an outer gutter 1310 of the basin, and on a lower portion of an outer gutter wall 1312 of the basinsuch generators may also be implemented on the actual outer wall if there is no gutter, or when the gutter system does not extend to the full depth. Rectangular members may also be used in which case the spacing would be approximately 8 times the azimuthal width of the members. As illustrated in FIG. 17, vortex generators 1330 can also have non-linear shapes, such as being angled or curved. In the case of angled vortex generators, they may be positioned with their point toward either the upstream or downstream directions of the movement of the foils and the resultant mean flow.

The interactions between the mean flow with the vortex generators can increase the Reynolds stresses and overall turbulence intensity in the vicinity of the hydrofoil path which can provide for thicker boundary layers in the water. These enhanced boundary layers can dissipate substantially more energy than an equivalent-sized smooth surface. Additionally, the transport of momentum by turbulent diffusion, specifically associated with the larger vortices, can allow the basin floor or wall areas covered with the vortex generators to provide strong sinks for both azimuthal and radial momentum. In effect these elements can allow the fluid within the basin to better transmit a torque to the basin itself.

While each vortex generator can have a squared cross section, as shown in FIGS. 14, 15, 16 and 17, other cross-sectional shapes can also be used, such as rounded, rectangular, or other prisms or three dimensional shapes. In some preferred implementations, each vortex generator has cross-sectional dimensions of approximately 1 foot square, although side dimensions of less than 1 foot or greater than 1 foot can also be used. The vortex generators can be preferably spaced apart 6-12 ft. For example, if used on a bottom surface of the pool, the vortex generators can be spaced apart along radial lines, at an average azimuthal spacing of 6 to 12 feet. If positioned on a vertical sidewall of the pool, the vortex generators can be spaced apart uniformly. Still in other variations, spacing of vortex generators can be varied around the pool so as to achieve different effects.

Figure 18:
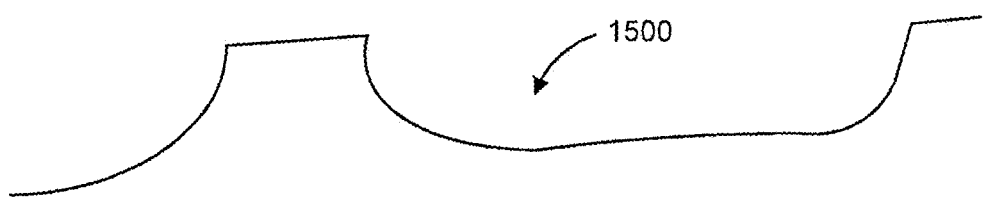
FIG. 18 illustrates an embodiment of a smooth (curved) pool profile where the vortex generators meet the side walls or floor.

In order to facilitate cleaning of the vortex generators and pool, and to avoid the collection of debris in the corners in and around the vortex generators, some implementations may opt for smooth (curved) pool profiles 1500 where the vortex generators meet the side walls or floor, as shown by way of example in FIG. 18.

In some implementations, the vortex generators can be formed out of a rigid or solid material and can be permanently affixed to the pool. For example, the vortex generators may be made of concrete reinforced with rebar and integrated into the basin structure. In other implementations, the vortex generators may be modular and attached with bolts, or constructed of plastic, carbon fiber, or other less rigid or solid material. These modular vortex generators can also allow for custom configuration of variable spacing, sizes and orientation. For instance, various combinations and arrangements of fixed and modular vortex generators may be employed.

Gutter System to Counter Azimuthal Currents (Vaned Cavity Gutters)

The previously discussed systems, such as vortex generators, roughness enhancement and other protrusions or flaps, can be configured to reduce lazy river flows by increasing turbulent dissipation within the flow. Additionally, these systems can act as a sink or inhibitor for both the mean azimuthal/longitudinal momentum and also the alternating currents in the radial/transverse and vertical directions. Alternatively, or additionally, azimuthal/longitudinal flow can be redirected by a gutter system employed at an inner beach area of the circular, crescent shaped or linear basin ("inside gutter system"), at an outer wall of the basin ("outer gutter system"), or both. The basic principal of these flow redirection gutters can be to capture the kinetic energy of the flow as potential energy by running it up a slope. The fluid can then be returned to the basin with a different velocity vector direction to that with which it arrived. This redirection can be accomplished with a system of vanes, but other means such as tubes or channels can also be implemented.

In some implementations, the gutter system includes a sloped floor overlaid by a water-permeable, perforated grate, typically of 2540% open area. In this case for an inside (sloped beach) gutter system, the slope of the grating can be greater than the slope of the angled floors or beach, forming a cavity between the sloped floor of the beach and the more steeply sloped grating that extends around the center island in the basin. For a 500 ft diameter circular wave pool with wave generation around the outer perimeter, the cavity may extend 20-40 ft away from the island with the bottom floor being sloped at approximately 5-9 degrees and the perforated gratings forming the top cover of the cavity being sloped at approximately 10-20 degrees. The slopes may be chosen differently for smaller or larger pools, with larger pools requiring less steep slopes and smaller pools requiring a somewhat steeper slope.

This cavity alone can absorb wave energy and reduce reflected waves generated from the movement of the foil around the basin. Additionally, the cavity can reduce the azimuthal currents near the sloped beach through simple dissipative mechanisms as water entering through the gratings may encounter enhanced turbulence. For a circular wave pool implementation, the importance of reducing the currents near the central island cannot be overstated. When there are significant currents parallel to the shore in the direction that the wave is breaking the currents can allow the wave to "overtake itself" requiring the wave generating mechanism to move at a higher speed if the form of the wave barrel is to be preserved. It is these currents that can tend to limit the minimum operational speed of the wave, whether it is generated by a hydrofoil type system or some other type of wave generator. This minimum operational speed where the wave will no longer barrel but instead presents itself as a foamy crest of white water is associated with a condition that has been dubbed "foam-balling".

Figure 19:
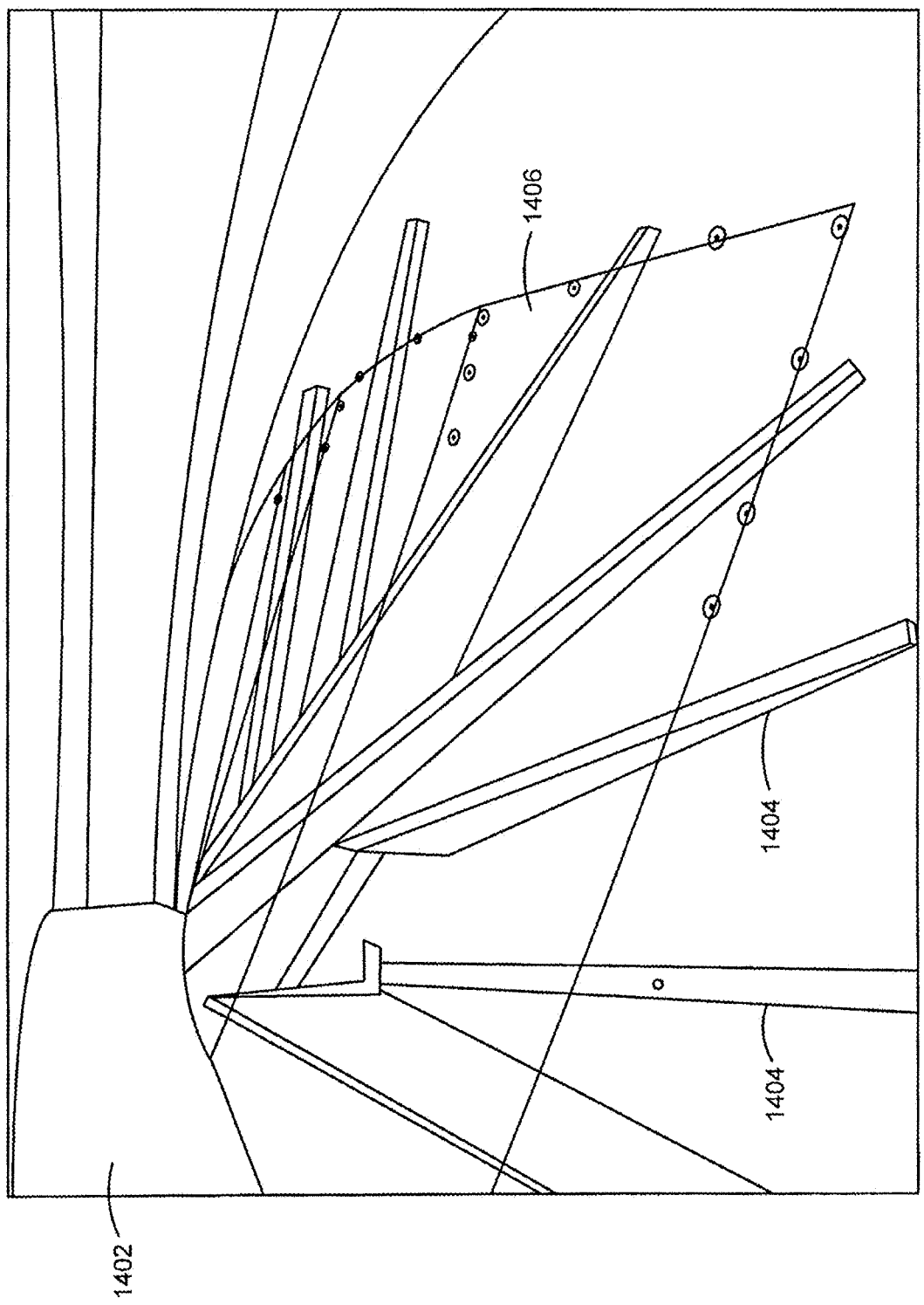
FIG. 19 illustrates an embodiment of at least a part of the cavity near the inner island of the pool being fitted with a series of angled vanes.

In other implementations, and as illustrated in FIG. 19, at least a part of the cavity near the inner island 1402 can be fitted with a series of angled vanes 1404. The angled vanes 1404 can be formed out of a solid material, such as concrete, or any number of a variety of solid materials. The angled vanes 1404 can be overlaid by a water-permeable perforated grate 1406. The perforated grate 1406 is shown in FIG. 19 as being transparent for purposes of showing the angled vanes 1404. In operation, an incoming wave can approach the cavity at a slight angle, enter through the grate 1406 and run up each angled vane 1404 under the grate 1406. Upon the wave run-up reaching a maximum height in the channel formed by the angled vane 1404, stored potential energy can then be returned to its kinetic form as the wave runs back down in a confined set of angled vanes 1404. The wave then exits the cavity through the grate with a component of azimuthal velocity different and largely opposite to that with which it entered. In this manner, a completely passive mechanism is provided for limiting or reversing azimuthal/cross-shore currents near the island.

In some implementations, the gutter system can provide complete or near-complete current reversal proximate the gutter. The importance of these vaned cavity gutter systems in their ability to mitigate the detrimental effects of foam-balling on the tube of the wave where a surfer may be riding is related to the extent to which their effects can be propagated away from the island. For this reason it is important that the vanes that redirect the flow be angled so as to inject the redirected flow into the interior of the basin away from the island. Typical configurations call for these vanes be angled at 45-70 degrees from the radius around a vertical axis. The exact angle will depend somewhat on the specific bathymetry of the basin, but in general there is a tradeoff where more steeply angled vanes will perform better at redirecting the currents, and less steeply angled vanes will better transfer the redirected fluid to the interior of the basin, slowing the wave at that location.

Figure 20:
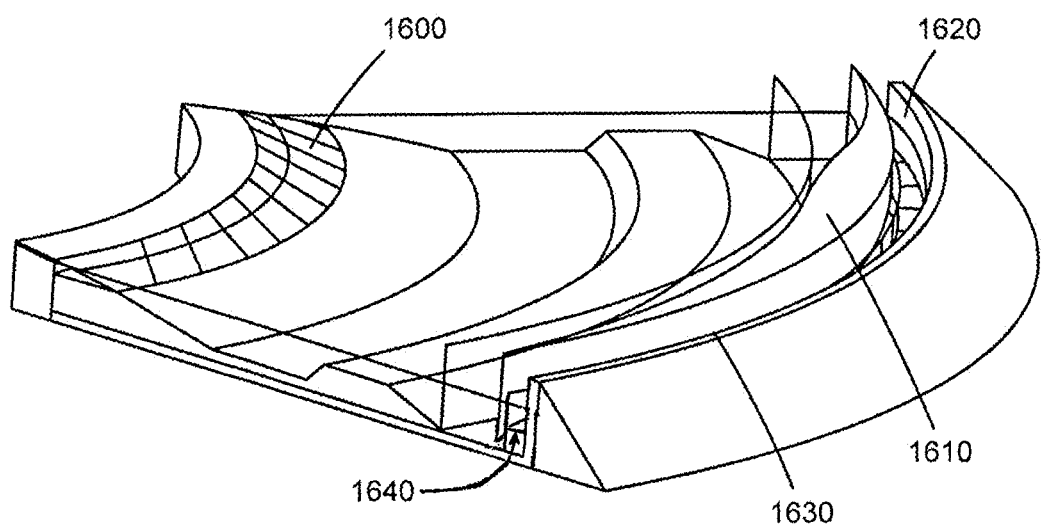
FIG. 20 shows an embodiment of a pool having both an inside gutter system and an outside gutter system between the foil and wave generation mechanism and the outer wall of the basin.

The vanes are angled both relative to a radius from the inner island 1402, as well as to the horizontal forming a triangle to accommodate the slope of the grating over the vanes. FIG. 20 shows both an inside gutter system 1600 (note that in this diagram the floor under the grating has no apparent slope, but there may be slope in most implementations), and an outside gutter system 1620 between the foil 1610 and wave generation mechanism and the outer wall of the basin 1630. The outer gutter 1620, which is shown to include a horizontal plate 1640 that inhibits vertical movement of the water level from pressure changes when the foil moves, can be constructed in a similar way to the inner gutter described above. Such an outer gutter 1620 can incorporate a series of sloping plates between the outer wall and the perforated wall. These plates would be inclined from the horizontal both in the radial and azimuthal sense. In this way fluid entering the gutters would be redirected and exit with a velocity directed inward and counter to the prevailing current.

Figure 21:
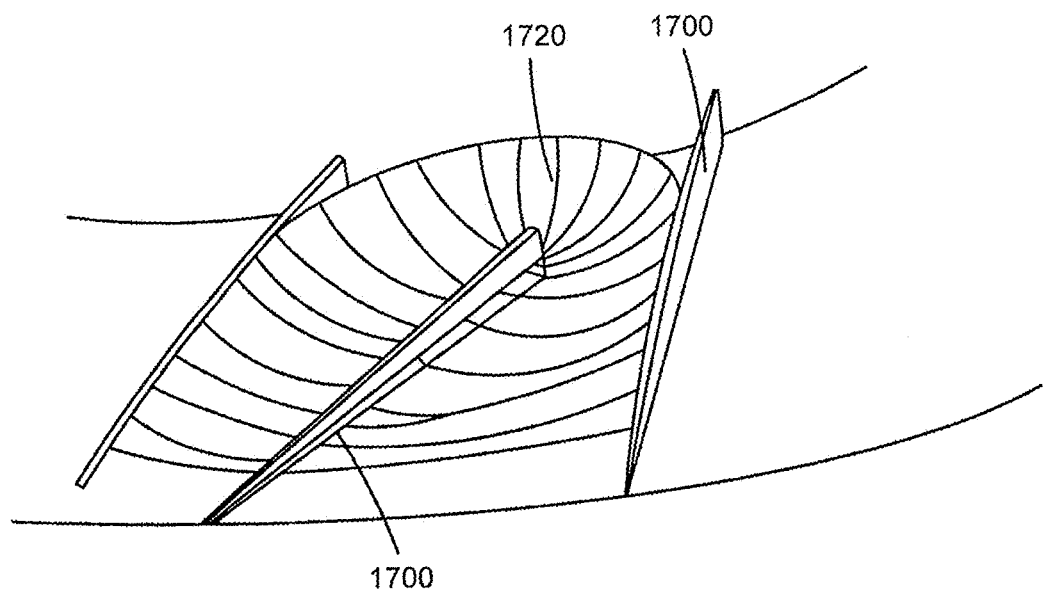
FIG. 21 illustrates an embodiment of a flow redirection gutter system on a sloping beach.

A further implementation of the flow redirection gutter system includes allowing the water that enters between any two vanes 1700 to run up the slope as described above. Upon approaching the highest point of the run-up, some of the flow is redirected to the adjacent gutter through a sloped opening 1720. In this way the flow is ratcheted around the beach further enhancing the cross shore transport. FIG. 21 illustrates this implemented on a sloping beach with the grating cover removed.

Wave Absorbing and Phase Cancellation Gutters

Figure 22:
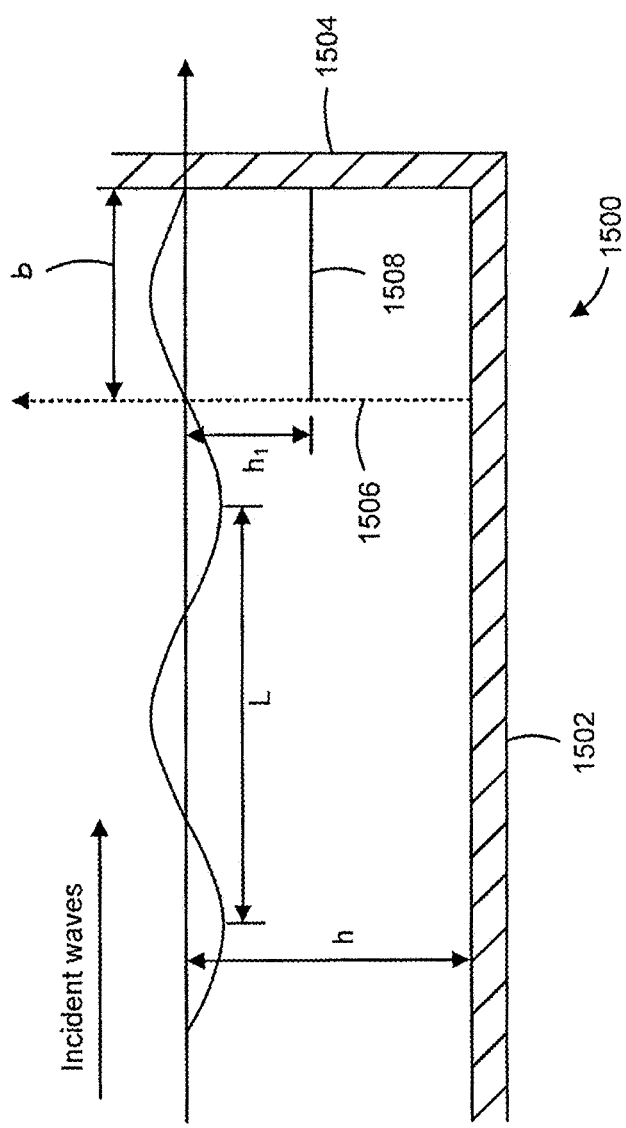
FIG. 22 illustrates an embodiment of implementations of gutters and/or baffles that can be used as a perforated wall.

In accordance some implementations of a wave pool using an annular basin, both the exterior and interior boundaries of the annular basin can be fitted with gutters and/or baffles that are configured to limit both the reflection of any incident waves that may be generated by the passage of a wave generating hydrofoil, and also reduce the persistence of the general random chop within the basin. For example, the gutters and/or baffles can be configured to control particular searching modes, or other waves of known wavelength that are present within the basin. As illustrated in FIG. 22, some implementations of the gutters and/or baffles 1500 can use a perforated wall 1506, having preferably 30%-60% open area, and placed parallel to or inclined to, the basin's water containment walls 1504 or beaches. The distance between the perforated wall 1506 and the main wall 1504 (b in FIG. 22) can be chosen so as to best dissipate the incident or chop waves of concern.

In some implementations, a gutter 1500 can include a simple vertical porous plate of approximately 20% to 50% open area, and preferably about 33% open area which can form a cavity between the outer wall and the hydrofoil path. The cavity width can be tuned for optimal phase cancellation, as described in further detail below.

In some implementations, the gutters are provided in the basin and are adapted for limiting the vertical displacements and reflexted energy associated with any trailing, or recovery, waves generated by a moving foil or other wave generating device. This may involve the use of a horizontal splitter plate or step 1508 set at a height h1 that is typically 0.2h-0.4h. In the case of a step the volume under the horizontal plate is filled, while for a splitter plate this volume is left open, in another variation the step replaces the horizontal splitter plate in the form of a vertical solid wall that extends from the bottom up to the height typically associated with the horizontal splitter plate. These gutters can also be integrated with azimuthal flow control and redirection systems, as described in the above section.

Figure 23:
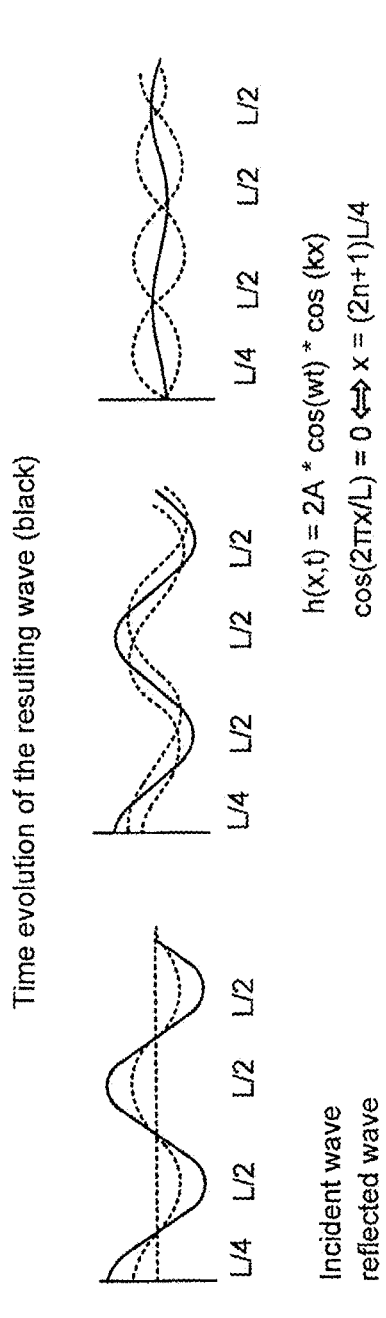
FIG. 23 illustrates an example of a time evolution of a resulting wave from a moving foil, including an incident wave and reflected wave(s).

FIG. 23 illustrates a time evolution of a resulting wave from a moving foil, including an incident wave and reflected wave(s). The wavelength of the wave incident on the gutter can be L. In some implementations, it is desirable to optimize the reflection percentage of the resulting wave from the porous wall of the gutter, such that, in rough approximation:

porous wall at a node (L/4)=>0% (*) reflection, 100% (*) transmission.

porous wall at a max (L/2)=>100% reflection, 0% transmission.

If there were no perforated wall, the node may occur at a distance of L/4 from the back wall of the basin, and the largest energy loss may also occur at this distance. However, due to the inertial resistance at the porous wall, a phase change can occur inside the gap which can slow the waves. This makes the distance for maximum energy loss to occur smaller than L/4. As can be seen in FIG. 23, the width of the gutter can be tuned based on the size and wavelengths of incident waves that the gutter is configured to mitigate. The gutters can be formed of one or more parallel porous plates, and can be further combined with a horizontal splitter plate and/or a vertical step as described further below.

A relationship between the wavelength of the wave incident on the gutter (L) and that of the wave inside the gutter cavity (L1) can be such that L> L1. This wavelength reduction can be due to dispersion and can allow for the use of smaller width gutters that would otherwise be required.

Note that there can be a similar effect when a splitter plate is used and the condition for minimum reflection can occur at a ratio of approximately b/L, which can be less than a corresponding ratio for a wave chamber without the splitter plate. This can be due to the waves in the gutter becoming shorter over the submerged plate and hence slowing down.

Figure 25:
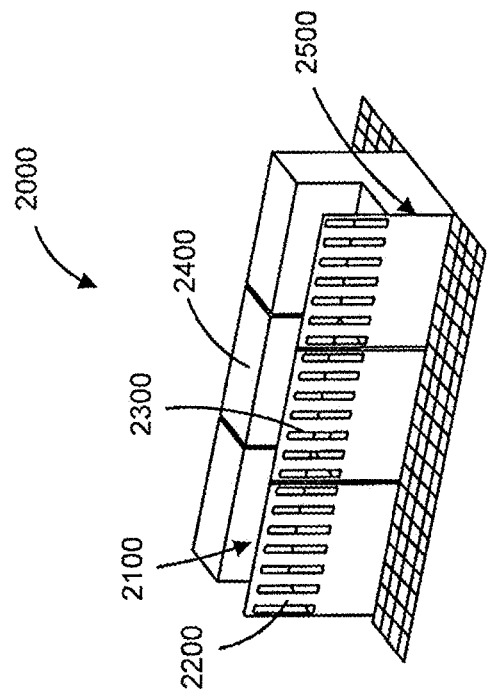
FIG. 25 illustrates an embodiment of a gutter having vertical slots in the gutter wall and a non-perforated step.
Figure 24:
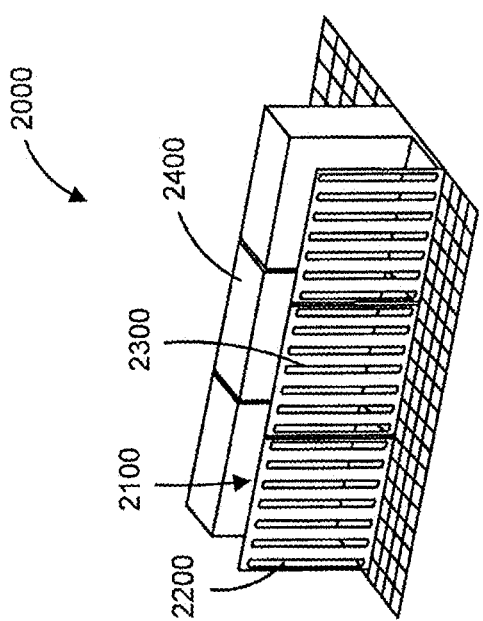
FIG. 24 illustrates an embodiment of a gutter having vertical slots in the gutter wall.

Additional implementations of a gutter 2000 are shown, for example, in FIGS. 24 and 25, which illustrate outer gutters 2100 for an annular basin. This outer gutter 2100 can include vertical slots 2300 in a gutter wall 2200 parallel to the main wall 2400 to form a porus cavity. The slotted wall could also take the form of an array of vertical cylinders that could have additional structural function, such as supporting a deck above the basin. The porosity ratios are preferably similar to that of a similar geometry using porous plate or gratings, i.e. between 30-50% open area.

Note a non-perforated step 2500 that differentiates the gutter shown in FIG. 24 from the gutter shown in FIG. 25. The step is one variant that, as with the splitter plate, can be combined with any of the various implementations. The step 2500 can function in a way similar to the splitter plate but can have the added advantage of being structurally more robust.

Horizontal and vertical slots or piles have different properties. Vertical slots or piles, when adequately spaced and sized, have a property that when the waves impact the vertical slots or piles obliquely, the incident and reflected paths can be different. For horizontally aligned piles or slots, obliqueness can have no effect and the submersion of the slot or pile closer to the still water level can be of importance as it can allow smaller scale chop or waves to enter exit the gutter area. Additionally, small variations in the water level can be used to adjust the relative depth of the horizontal pile or slot.

Figure 26:
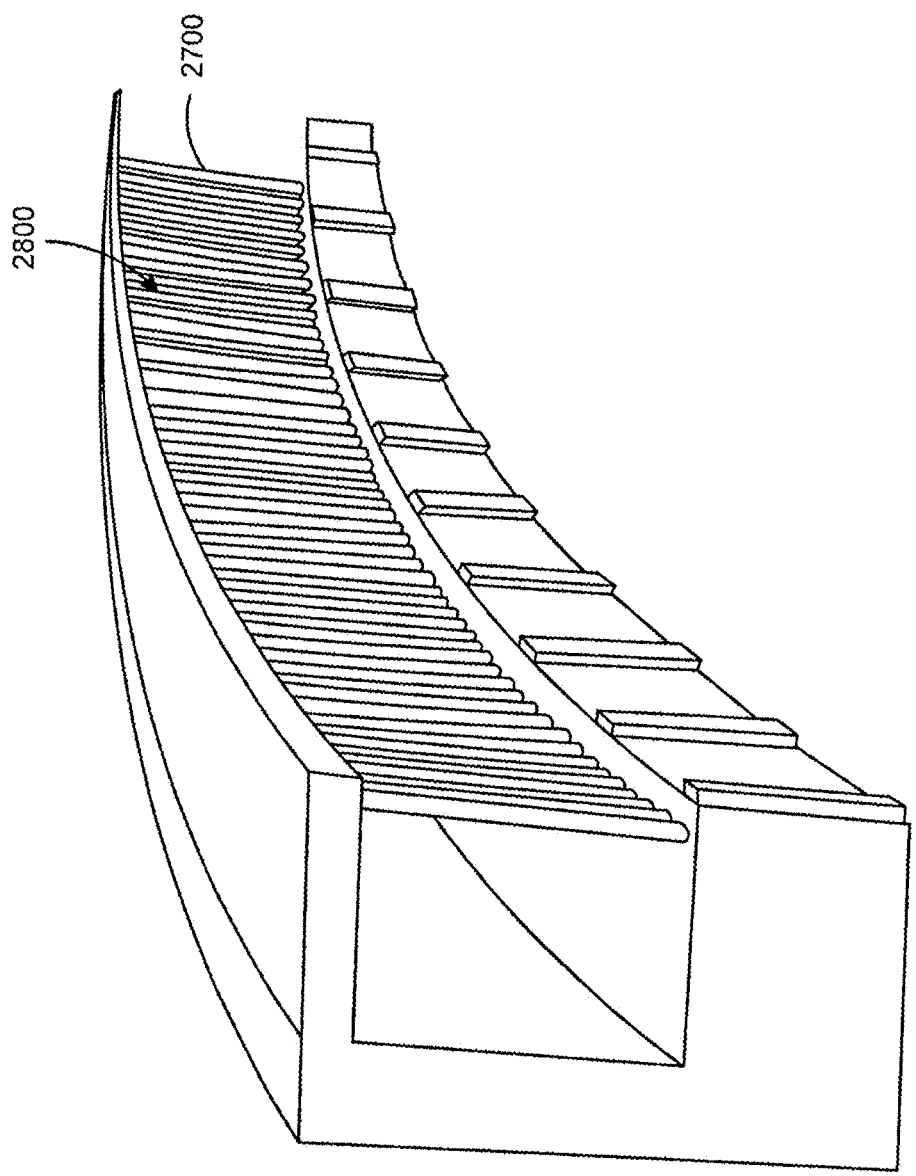
FIG. 26 illustrates an embodiment of a gutter system having porous walls integrated with vortex-generating roughness elements.

The porous walls for some gutter systems may also be integrated with vortex-generating roughness elements, such as described above, these can be seen on the lower wall of FIG. 26. As shown in FIG. 26 by way of example, some implementations can use vertical slots or bars 2700 to form the porous wall 2800. In addition, the slots or bars 2700 can be staggered such that alternative slots or bars protrude a different distances radially from the basin wall. In at least some instances it is not necessary that the slots or bars alternate in their protrusion; for example, in some implementations, every seventh or eighth slot or bar can protrude from a plane formed by the others. In some implementations the protrusion distance of the one or more slots or bars can be 8-24 inches and the distance between the protruding slots or bars can be 50-180 inches.

In some implementations consistent with the description herein, and consistent with the applications incorporated by reference herein, a wave generator and wave generation mechanism can be deployed in an open body of water such as an ocean, lake, river, pond, or the like. In such implementations, the wave generator and wave generation mechanism can be built in as large a scale as desired, yet can also accommodate a flexible integration and implementation.

Figure 27:
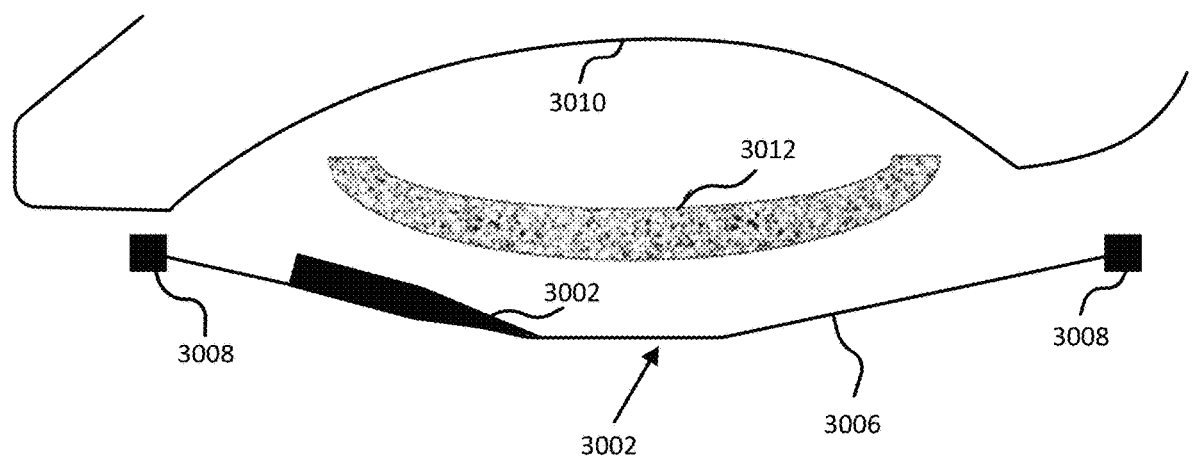
FIG. 27 illustrates an ocean or open body of water system.

FIG. 27 illustrates an implementation of a wave generator 3002 for an open body of water, and having a wave generation mechanism 3004 that is movable along a track 3006 by one or more moving mechanisms 3008. The track 3006 can be positioned and installed within a deep region of the body of water, or positioned and installed along an edge of the body of water, such as a reef, berm, beach, wall or jetty, or the like. The wave generation mechanism 3004 includes a foil, as described herein, that is configured to generate a substantially solitary wave in a direction that is substantially laterally to a direction of movement of the foil and toward a beach 3010, as described above.

In some implementations, a wave generation system utilizing an open body of water such as the ocean can include one or more artificial or natural reefs 3012. The reefs 3012 can be formed of any material, and can be completely or partially submerged. The reef 3012 can be an elongated structure, or can comprise multiple sections placed together to form an elongated reef 3012. In some implementations, one or more reefs 3012 can be formed of a pliable material that is cushioning to a surfer or rider, but which allows the wave resulting from the foil to crest and break over or near the reef 3012. In other implementations, the body of water includes a sloping beach, which slopes upward from a deep region of the body of water proximate the wave generation mechanism 3004 and toward a shallow region of the body of water.

The foil or hydrofoil is described above, and can be dynamically adjustable. The track 3006 can include one or more rails or pathways along which the wave generation mechanism 3004 traverses. The track 3006 can be formed to be parallel to the beach 3010 and/or reef 3012, or can be curved or provided with multiple curves. In yet some implementations, the track can be dynamically adjustable to create one of any number of curved or straight pathways for the wave generation mechanism 3004.

In some alternative implementations, the track 3006 can be provided substantially normally or perpendicularly to the beach 3010 and/or reef 3012. In these implementations, the wave generation mechanism 3004 can include one or two (or more) foils to provide solitary waves on either side of the track 3006. These implementations are suitable for an elongated or narrow bay, an elongated lake or lagoon, or the like. Such installation need not be symmetrical, and any number of artificial reefs can be provided to the body of water to cooperate with the wave generation mechanism to configure the wave and its speed, shape, etc.

In some implementations, the track 3006 is supported above a surface of the water (i.e. a height that exceeds a surface of the water at its highest anticipated tide) by a series of pylons that are spaced apart. The pylons may or may not be coupled by a wall or screen, which can serve to keep out or dampen normal ocean waves, swells, turbulence, or chop, or otherwise protect the area of water between the track and the reefs 3012 and/or the beach 3010. In some cases, a movable or adjustable wall may be installed along the track 3006, which wall can be configured to open or shut the wave area from the open water beyond the track 3006

The moving mechanisms 3008 can include motors, pulleys, cables, or the like. In some implementations, the wave generation mechanism 3004 can be coupled with, or integrated with, a moving mechanism to move the wave generation mechanism 3004 along the track 3006.

The reef 3012 may be parallel with the track 3006, or can have dimensions and spacing that vary along the distance of the track 3006, which can introduce variability in the wave generated by the wave generation mechanism 3004. The beach 3010 can be a regular beach, or can include a man-made berm, jetty or the like.

Figure 28:
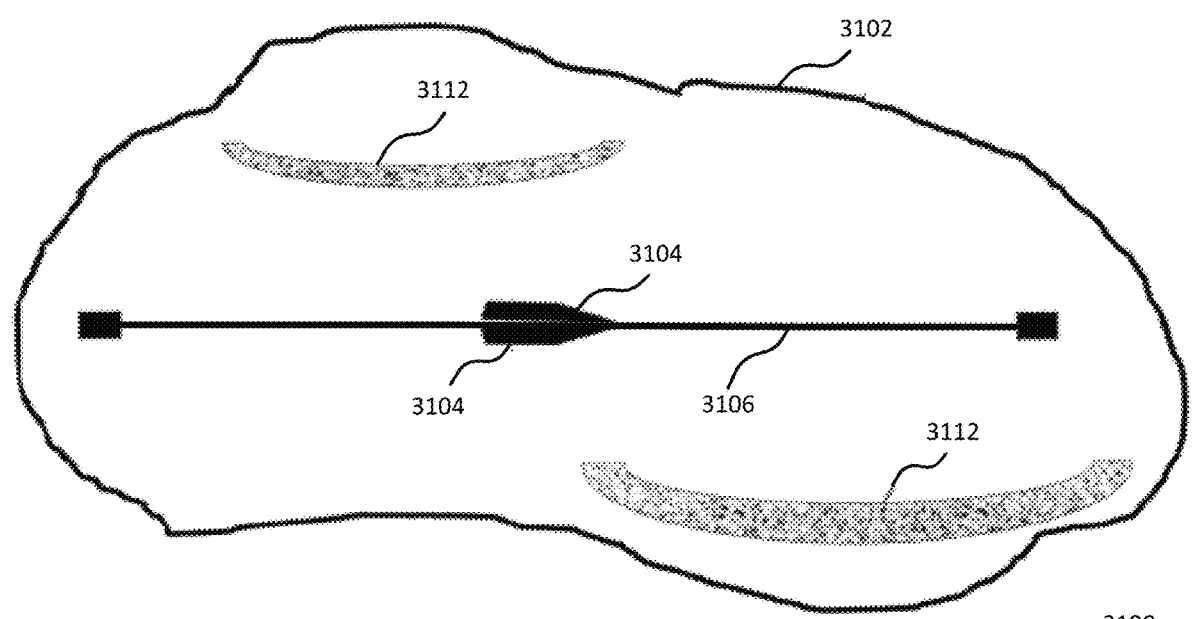
FIG. 28 illustrates a lake, pond, or closed body of water system.

FIG. 28 illustrates a wave generator implemented in a more closed body of water 3102 such as a lake, pond, river, free-form pool, or the like. The body of water 3102 can have any shape. The wave generator can include a wave generation mechanism 3104, which is movable along a track 3106 between two termini. The body of water 3102 can have a bottom surface that forms a beach or a shoal, or may include one or more artificial reefs 3112 that are configured to manipulate wave energy from the wave generation mechanism to form surfable waves of any desired size, shape, speed, etc.

The wave generation mechanism 3104 can include opposing foils that are connected together. The wave generation mechanism 3104 can be bi-directional, i.e. moved between each terminus. The bi-directionality can include "flipping" or turning the wave generation mechanism and/or foils physically to reverse their orientation. In other implementations, the foils can be dynamically changed to change their shape, orientation or configuration, such that a leading edge of the foil becomes a trailing edge, and vice-versa. In yet other implementations, the foils can be dynamically changed while they are moved through water, to introduce variability in the wave produced, such as a sudden peak or temporary flattening out of the wave.

Although a few embodiments have been described in detail above, other modifications are possible. Other embodiments may be within the scope of the following claims.

What is claimed:

1. A wave park comprising:
a pool for containing a body of water;
a track positioned adjacent a side of the pool; and
a foil coupled to the track, the foil positioned to at least partially extend into the pool, the foil having a curvilinear cross-sectional geometry that includes a leading surface that is concave about a vertical axis to provide drag to generate a primary wave laterally in the body of water that contacts the leading surface of the foil, and a trailing surface that narrows from a maximum width of the foil to a point at an end of the foil, the trailing surface to decrease the drag of the foil and to minimize oscillatory waves that trail the primary wave.

2. The wave park in accordance with claim 1, wherein the pool further comprises a deep region, and wherein the track is arranged proximate the deep region.

3. The wave park in accordance with claim 2, wherein the pool further comprises a bottom having a contour that slopes upward from the deep region toward a sill.

4. The wave park in accordance with claim 3, wherein the sill is formed by an elongated reef that is formed on the bottom of the pool.

5. The wave park in accordance with claim 1, further comprising a vehicle coupled with the foil and positioned on the track, the vehicle configured for moving the foil along the track.

6. The wave park in accordance with claim 1, wherein the track is linear.

7. The wave park in accordance with claim 1, wherein the track is curved.

8. A wave park comprising:
a pool for containing a body of water;
a track positioned adjacent a side of the pool; and
two or more foils coupled to the track, each of the two or more foils positioned to at least partially extend into the pool, each foil having a curvilinear cross-sectional geometry that includes a leading surface that is concave about a vertical axis to provide drag to generate a primary wave laterally in the body of water that contacts the leading surface of the foil, and a trailing surface that narrows from a maximum width of the foil to a point at an end of the foil, the trailing surface to decrease the drag of the foil.

9. The wave park in accordance with claim 8, wherein the pool further comprises a deep region, and wherein the track is arranged proximate the deep region.

10. The wave park in accordance with claim 9, wherein the pool further comprises a bottom having a contour that slopes upward from the deep region toward at least one sill.

11. The wave park in accordance with claim 10, wherein the sill is formed by an elongated reef that is formed on the bottom of the pool.

12. The wave park in accordance with claim 8, further comprising at least one vehicle coupled with at least one foil of the two or more foils and positioned on the track, the at least one vehicle configured for moving the at least one foil along the track.

13. The wave park in accordance with claim 8, wherein the track is linear.

14. A wave park comprising:
a pool for containing a body of water;
a track positioned adjacent a side of the pool;
a vehicle arranged on the track, the vehicle for moving along a length of the track; and
at least two foils coupled with the vehicle on opposite sides of the track to be moved by the vehicle along the length of the track, each of the at least two foils positioned to at least partially extend into the pool, each of the at least two foils having a curvilinear cross-sectional geometry that includes a leading surface that is concave about a vertical axis to provide drag to generate a primary wave laterally in the body of water that contacts the leading surface of the foil, and a trailing surface that narrows from a maximum width of the foil adjacent the leading surface to a point at an end of the foil, the trailing surface to decrease the drag of the foil.

15. The wave park in accordance with claim 14, wherein the pool further comprises a deep region, and wherein the track is arranged proximate the deep region.

16. The wave park in accordance with claim 15, wherein the pool further comprises a bottom having a contour that slopes upward from the deep region toward at least one sill.

17. The wave park in accordance with claim 16, wherein each of the at least one sill is formed by an elongated reef that is formed on the bottom of the pool.

18. The wave park in accordance with claim 15, further comprising an elongated reef formed on a bottom of the pool proximate the deep region.

* * * * *